United States Patent
Yanagi et al.

(10) Patent No.: US 7,280,191 B2
(45) Date of Patent: Oct. 9, 2007

(54) LENS METER

(75) Inventors: Eiichi Yanagi, Tokyo (JP); Shinichi Nakamura, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 291 days.

(21) Appl. No.: 11/043,867

(22) Filed: Jan. 26, 2005

(65) Prior Publication Data

US 2005/0162642 A1   Jul. 28, 2005

(30) Foreign Application Priority Data

Jan. 28, 2004   (JP) .............................. 2004-019131

(51) Int. Cl.
   *G01B 9/00*   (2006.01)
(52) U.S. Cl. .................... 356/124; 356/127; 356/124.5
(58) Field of Classification Search ........ 356/124–127; 359/362–442
   See application file for complete search history.

(56) References Cited

U.S. PATENT DOCUMENTS 6,778,264 B2   8/2004   Fukuma et al.

FOREIGN PATENT DOCUMENTS

| JP | 2002-202219 | 7/2002 |
|---|---|---|
| JP | 2002-257680 | 9/2002 |
| JP | 2002-257681 | 9/2002 |
| JP | 2002-296549 | 10/2002 |
| JP | 2003-194670 | 7/2003 |

*Primary Examiner*—Gregory J. Toatley, Jr.
*Assistant Examiner*—Tri Ton
(74) *Attorney, Agent, or Firm*—Chapman and Cutler LLP

(57) ABSTRACT

A lens meter that measures optical characteristics of lenses of an eyeglass unit and an inspection glass unit, including a glass unit support, light sources, light-projecting and -detecting optical systems, light detectors, and inspection glass frame adaptors for the inspection glass unit. The support includes two sandwiching members displaceable to sandwich an outer peripheral portion of the eyeglass unit, and the adaptors can be fitted to and detached from the sandwiching members. The adaptors include projecting sandwiching portions projecting toward opposite sandwiching members when the adaptors are fitted to the sandwiching members and which contact portions of the inspection glass unit's frame, other than movable areas of tabs of detachable lenses projecting from a frame of an inspection glass lens unit supported by the support as the eyeglass unit, whereas adaptor portions other than the projecting sandwiching portions do not interfere with the movable areas of the tabs.

13 Claims, 23 Drawing Sheets

Note:
※ 1 · · · Measurement
※ 2 · · · Mode
※ 3 · · · Printing
※ 4 · · · Left
※ 5 · · · Right Note:
※ 1 · · · Measurement
※ 2 · · · Return
※ 3 · · · Printing
※ 4 · · · Left
※ 5 · · · Right

SECT.A-A

SECT.B-B

SECT. E-E

SECT. F-F

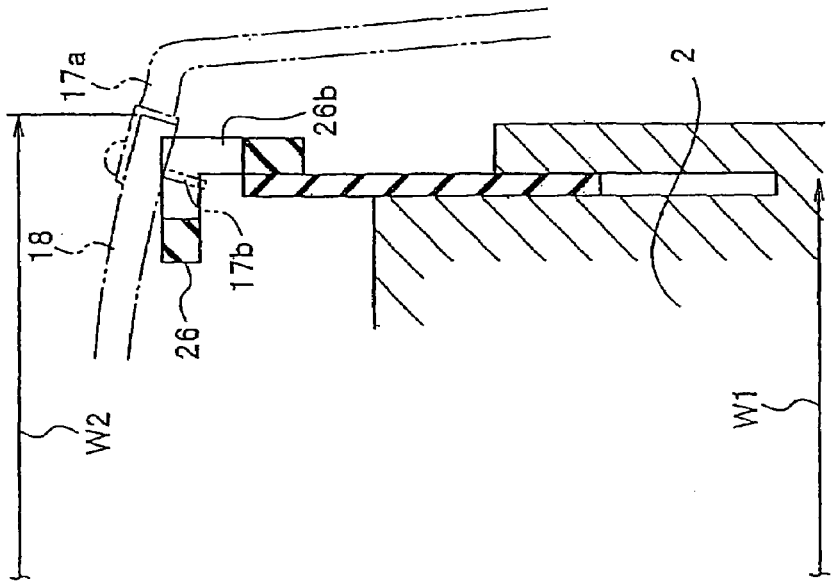
FIG.10(a)  SECT.C-C
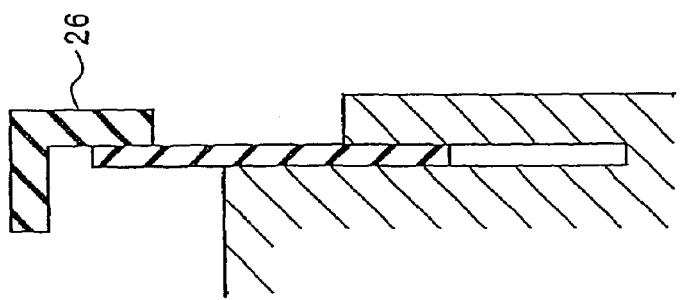
FIG.10(b)  SECT.D-D

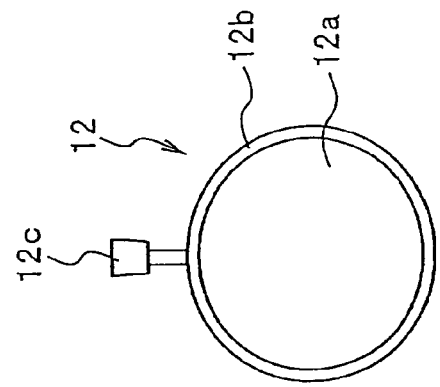
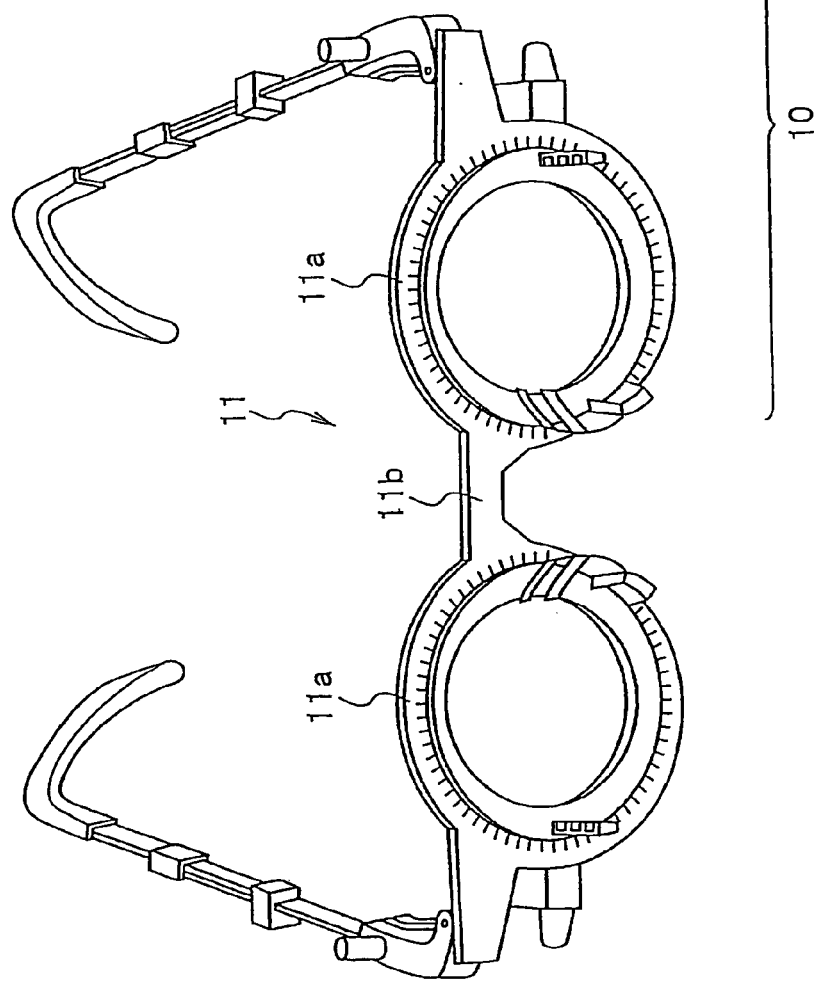

FIG.19(a)
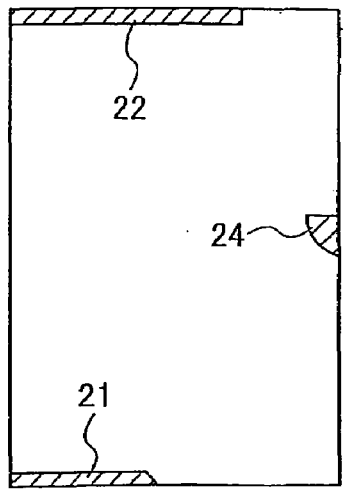 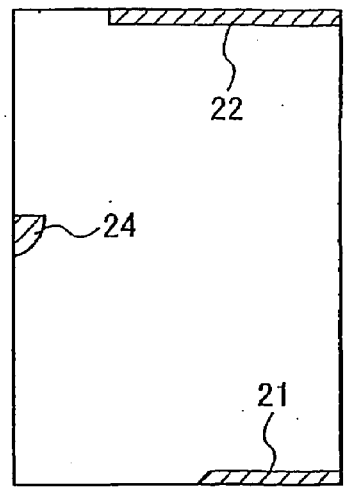
Detected image by left CCD    Detected image by right CCD
FIG.19(b)
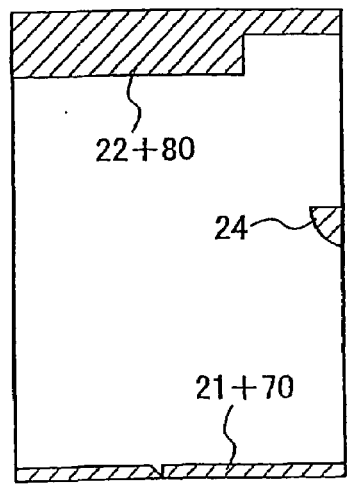 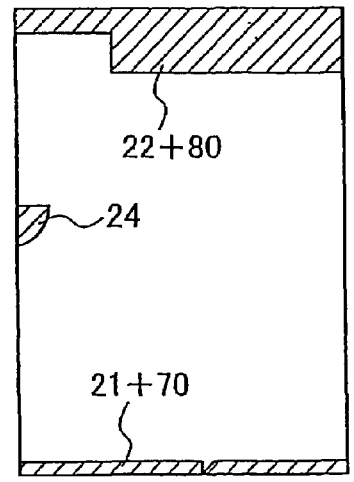
Detected image by left CCD    Detected image by right CCD

SECT. E-E

PRIOR ART

LENS METER

BACKGROUND OF THE INVENTION

1. Technical field of the Invention

The present invention relates to a lens meter to measure optical characteristics of eye glass lenses. More particularly, the invention relates to a lens meter which is applicable to both eye glasses as ordinary products as well as test glasses having trial frames.

2. Related Art Statement

Heretofore, there have known lens meters for measuring the optical characteristics of lenses assembled into eye glass units.

Such a lens meter comprises an eye glass support adapted for supporting the eye glass unit at a given location such that lenses may be substantially horizontal, a light source, such as an LED, adapted for emitting given inspection lights for the measurement of the optical characteristics, light-projecting optical systems adapted for the inspection lights emitted from the light sources to lenses of the eye glass unit supported by the eye glass support almost in optical axis directions of the lenses, respectively, a light detector such as a CCD, and detecting optical systems adapted for leading transmitted lights of the inspection lights through the lenses of the eye glass unit to the light detectors, respectively, wherein the light-projecting optical systems lead the inspection lights emitted from the light sources to the lenses of the eye glass unit supported by the eye glass support almost in the optical axes directions of the lenses, respectively, the detection optical systems lead the transmitted lights through the lenses of three eye glass unit to the light detectors, respectively, and the light detectors detect the light intensity distribution of the transmitted lights to measure the optical characteristics of the eye glass unit, respectively.

Different from a meter device for measuring a single lens, the above lens meter is adapted to measure the optical characteristics of the lenses assembled to an eye glass frame in the form of the eye glass unit. Therefore, as shown in FIG. 21, the eye glass support comprises two sandwiching members 21 and 22, which are displaceable nearer or remoter relative to each other and are adapted to sandwich the outer edge of the eye glass unit in cooperation with each other. The sandwiching members 21 and 22 sandwich the outer edge of the frame in a case of a framed eye glass unit, whereas the sandwiching members 21 and 22 sandwich the outer edges of the lenses in the case of a frame-less eye glass unit. Thereby, the lenses of the eye glass unit are fixed at given locations for measurement.

From the standpoint of the posture stability of the eye glasses when set, the eye glass support including the sandwiching members 21 and 22 generally supports the eye glass unit such that the lenses are substantially horizontal. In the lens meter 100 shown in FIG. 21, supporting pins 23 and 23 erected on an under side of the lenses are adapted to support the under faces of the lenses. See JP-A 2002-202219, JP-A 2002-257680, JP-A 2002-257681, JP-A 2002-296549 and JP-A 2003-194670.

The above-mentioned conventional lens meter is mainly used for measuring the optical characteristics of the eye glass unit as a product. There is also a demand, however, to measure the optical characteristics of detachable lenses 12 (See FIG. 13(b)) fitted to a so-called trial frame 11 (See FIG. 13(a)) which is used for examination of visual acuity, etc. before the product eye glass unit is produced. In this case, the inspection glass unit consisting of the trial frame 11 and the detachable lenses 12 fitted to the trial frame 11 needs to be supported by the glass unit support.

However, if the inspection glass unit 10 is set in the same manner as in the case of the ordinary eye glass unit as a product, as shown in FIG. 22, the sandwiching member 21 (or 22) may touch a tab 12c provided at the detachable lens 12 and turn the detachable lens 12 together with the tab 12c relative to the frame 11.

When the detachable lens 12 is an astigma-correcting lens, the lens 12 is turned to make an angle of a cylindrical axis 12 of the lens different from a set one, so that the target optical characteristics cannot be measured.

Further, the eye glass unit is sandwiched by the sandwiching members 21, 22 such that the lights passing the optical axes of the glasses of the eye glass unit are inputted into almost the centers of the light detectors, respectively. However, even if the detachable lens 12 of the inspection glass unit is not turned, it may be that one of the sandwiching members, 21, holds the frame 11 via the tab 12c between the other, and thus the optical axis 12d of the lens 12 is apart from the supporting pin 23 deposited at a location corresponding to almost the center of the optical detector, by a distance L5 corresponding to a projected amount of the tab 12c from the frame 11. As a result, the light passing the optical axis 12d of the lens 12 is not inputted into almost the center of the optical detector, so that measurement results may be obtained at good precision.

SUMMARY OF THE INVENTION

The present invention has been accomplished in view of the above circumstances, and is to provide a lens motor which can measure optical characteristics of lenses readily and at high precision for eye glass units as ordinary products and inspection eye glass units having trial frames.

According to the lens meter of the present invention, the sandwiching members for sandwiching and supporting the eye glass unit are provided with inspection eye glass frame adaptors which prevent the sandwiching members or the like from butting the tab of the detachable exchange type lens projecting from the inspection eye glass frame such as the trial frame.

That is, the lens meter according to the present invention comprising a glass unit support for supporting an eye glass unit such that glasses of the eye glass unit are almost horizontal, light sources for emitting given inspection lights, respectively, light-projecting optical systems for projecting inspection lights emitted from the light sources upon the lenses of the eye glass unit supported by the glass unit support substantially along optical axes of the lenses, respectively, light detectors, and light-detecting optical systems for leading transmitted lights of the inspection lights passing the lenses of the eye glass unit to the light detectors, respectively, said glass unit support comprising two sandwiching members which are displaceable nearer or apart from each other and adapted to sandwich an outer peripheral portion of the eye glass unit in cooperation with each other, and inspection glass frame adaptors being capable of being fitted to and detached from said two sandwiching members, respectively, said inspection glass frame adaptors comprising projecting sandwiching portions, respectively, which project toward the opposite sandwiching members, respectively, when the adaptors are fitted to the sandwiching members, respectively, and which contact those portions of the frame of the inspection glass unit other than movable areas of tabs of detachable lenses projecting from a frame of an inspection glass lens unit supported by the glass unit support as the eye glass unit, whereas those portions of the adaptors other than the projecting sandwiching portions do not interfere with the movable areas of the tabs, respectively.

The term "inspection glass unit" is used herein to mean not an eye glass unit as a product consisting of a pair of eye glass lenses and their frame but a trial glass unit in which one or more of numerous kinds of detachable lenses 12 having almost the same size with different optical characteristics are fitted into a trial frame (inspection glass frame) as shown in FIG. 13, for example. The inspection glass unit is used for visual acuity test before the production of an eye glass unit as a product.

As shown in FIG. 13(b), the tab is a grip provided at a ring 12b for holding a lens body 12a of the detachable lens 12 from an outer peripheral portion. The tab functions not only as the grip but also as an indicator for showing front and rear sides and a visual correction degree of the lens body 12a and an indicator for indicating a standard position of the an angular degree of a cylindrical axis of an astigma-correcting lens.

A movable area of the tab is a movable range in which the tab is movable when the detachable lens 12 is fitted to the trial frame 11, not a locus range in which the tab moves during attaching and detaching the detachable lens relative to the trial frame. Therefore, since the lens 12 can be turned almost around the optical axis of the lens 12 as its rotational axis relative to the trial frame 11 in the state that the detachable lens 12 is fitted to the trial frame 11, the movable are of the tab is a band-shaped circular arc range as the locus of the tab 11 as observed when the lens 12 is turned around the rotatable range.

According to the lens meter of the present invention, when the optical characteristics of the detachable lens fitted to the trial frame are to be measured, the frame of the inspection glass unit can be sandwiched and held with the projecting sandwiching portions of the inspection glass frame adaptors in the state that the adaptors are fitted to the sandwiching members, respectively. In addition, since the adaptors do not interface with the movable areas of the tabs of the detachable lenses fitted to the trial frame of the inspection glass unit, the adaptors do not move the detachable lenses when the adaptors sandwich the inspection glass unit. Thus, the optical characteristics of the lenses can be measured at high precision, while the lenses maintain positional relationship to the frame defined when the inspection glass unit is set to the lens meter.

Since the adaptors do not contact the tabs, the measured results can be obtained at high precision from the standpoint of preventing the optical axes of the inspection glass lenses from largely deviating from almost the centers of the optical detectors, respectively.

Further, since the adaptors are fitted to the sandwiching members of the lens meter, not to the inspection glass unit, the adaptors can be attached and detached more easily as compared with a case where such adaptors are fitted to the inspection glass unit.

The contents of Japanese patent application No. 2004-019131 and those of U.S. Pat. No. 6,778,264B2 are incorporated hereinto by reference to them.

BRIEF DESCRIPTION OF THE DRAWINGS

For a better understanding of the invention, reference is made to the attached drawings, wherein:

FIGS. 10(a) and 10(b) are sectional views of FIG. 5 along with sectional lines C-C and D|D, respectively.

FIGS. 13(a) and 13(b) are schematically showing an inspection eye glass unit, illustrating a trial frame (inspection glass frame) and a detachable lens, respectively.

FIGS. 19(a) and 19(b) are schematic views illustrating a function to detect based on projection images in CCDs (light detectors) whether the inspection glass frame adaptors are fitted or not.

BEST MODES TO CARRYING OUT THE INVENTION

Figure 1A:
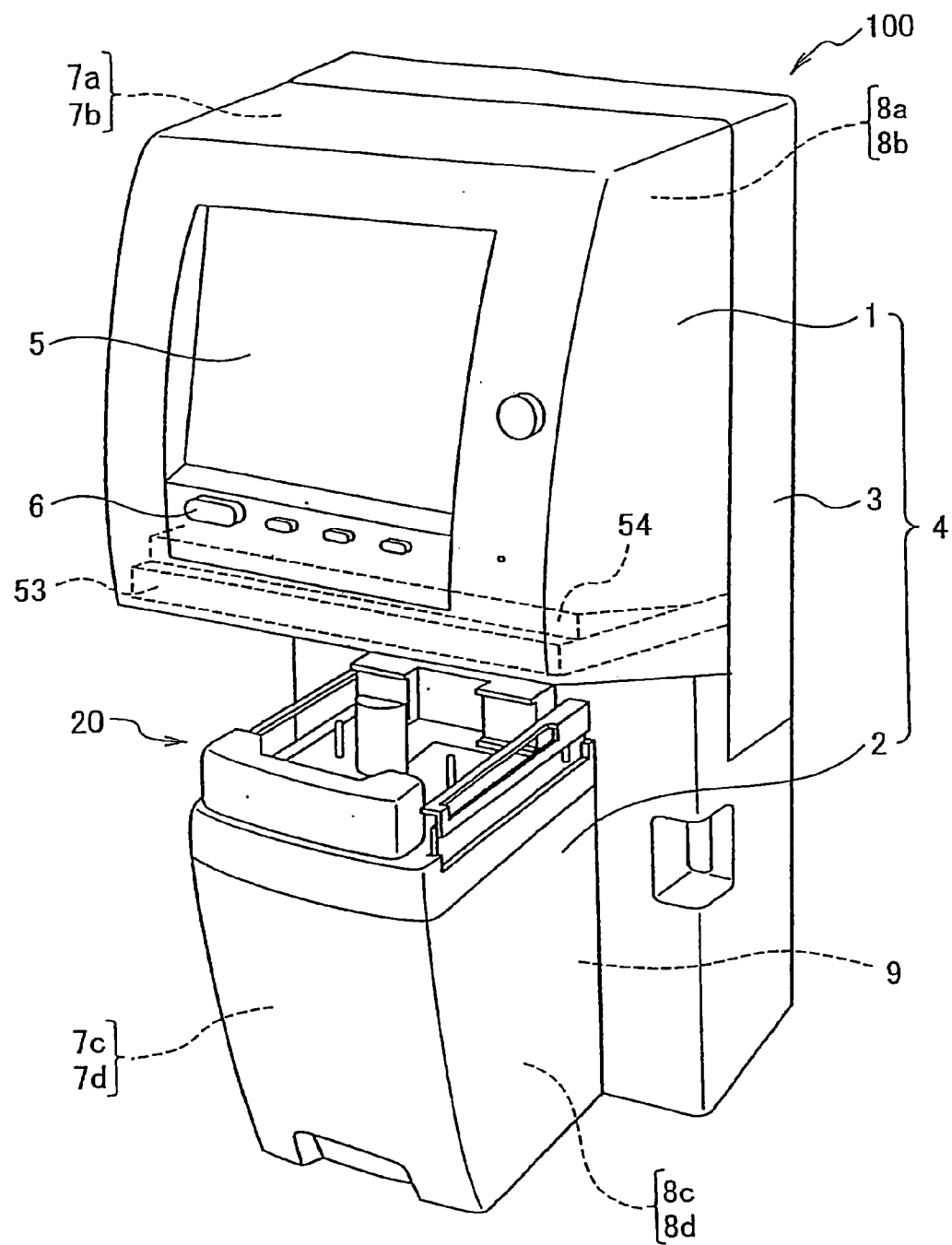
FIG. 1A is a perspective view of an appearance of a lens meter according to one embodiment of the present invention showing a general construction thereof.
Figure 1B:
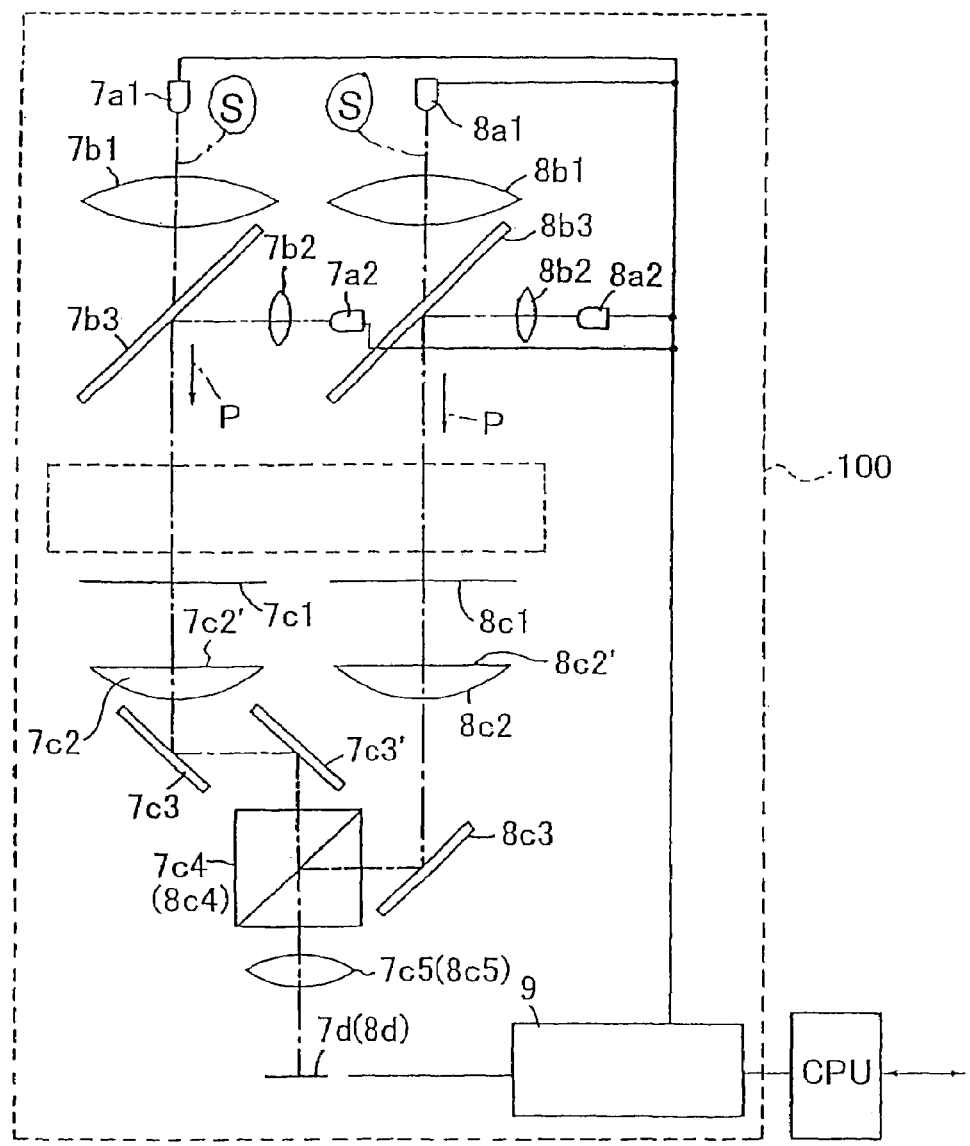
FIG. 1B is a figure showing an example of optical systems, etc. built in the lens meter shown in FIG. 1A.

In the following, best modes of the lens meter according to the present invention will be explained with reference to the drawings. FIG. 1A is a perspective view over viewing a general construction of a lens meter 100 as one embodiment of the present invention. FIG. 1B illustrates optical systems, etc. built in the lens meter shown in FIG. 1A by way of example.

(Construction)

Figure 2:
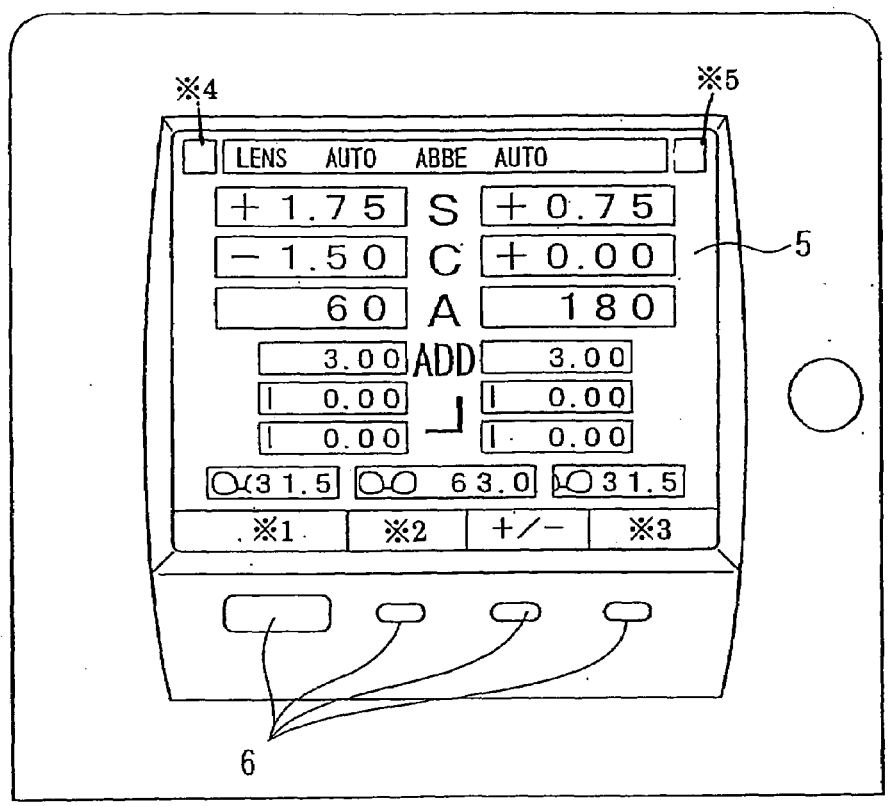
FIG. 2 is a schematic view showing an example of a monitor (No. 1) provided in the lens meter shown in FIG. 1A
Figure 3:
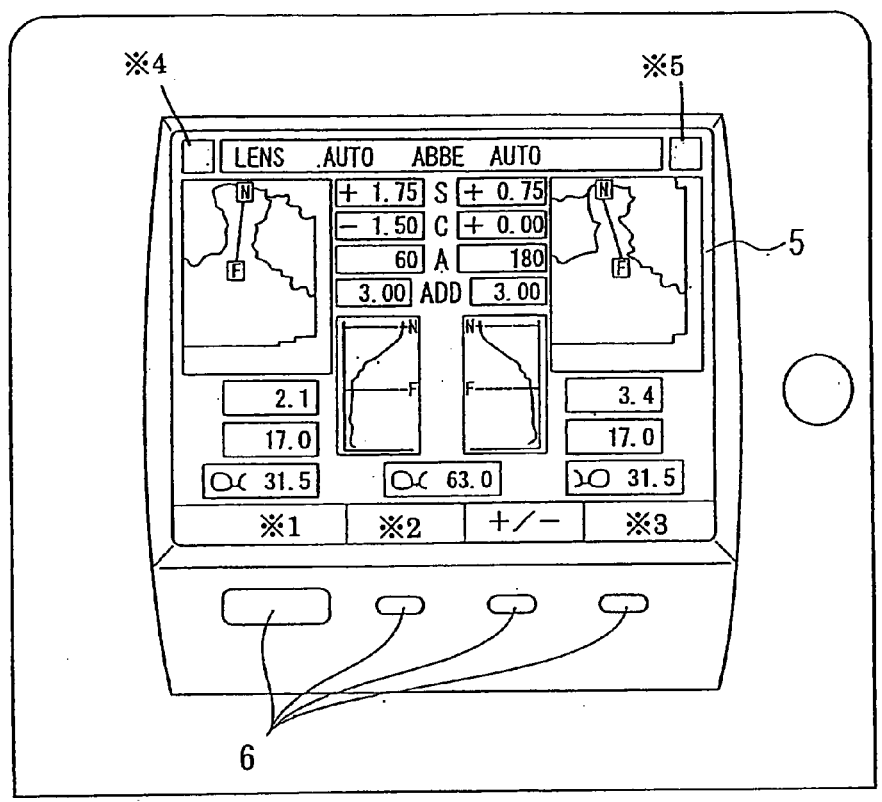
FIG. 3 is a schematic view showing an example of a monitor (No. 2) provided in the lens meter shown in FIG. 1A.

The lens meter 100 shown comprises a casing 4 having a fallen cup-like section as a whole as viewed from a side direction. The casing 4 comprises an upper casing body 1, a lower casing body 2 and a rear casing body 3. The upper casing body 1 has, at its front face, a monitor 5 for displaying measured results of optical characteristics and various operating switches 6 as shown in FIG. 1(A), and FIGS. 2 and 3.

Between the upper casing body 1 and the lower casing body 2 is provided a setting section 20 (eye glass support) at which an eye glass unit 16 (See FIG. 5) of which optical characteristics are to be measured. Inside the upper casing body 1 are provided light sources 7a, 8a such as LEDs and light-projecting optical systems 7b and 8b. The light sources 7a, 8a emit inspection lights S. S. which are depicted in FIG. 1(B). correspondingly to right and left lenses of the eye glass unit 16 supported at the setting section 20. The light-projecting optical systems 7b and 8b project the inspection lights emitted from the light sources 7a and 8a almost along optical axes 18a, 18a of the lenses 18, 18, respectively. The light sources 7a and 8a may be partially or entirely arranged in the rear casing body 3, and a part of the light-projecting optical systems 7b and 8b may be provided in the rear casing body 3.

Inside the upper casing body 1 are provided 2-stage lift type light-shielding members 53 and 54 each having a rectangular section as shown with broken lines along lower inner peripheral portions of a front face and opposite side faces of the upper casing body 1.

Inside the lower casing body 2 and the rear casing body 3 are provided CCDs 7d and 8d (light detectors, in this embodiment, a common CCD being used for 7d and 8d), detecting optical systems 7c and 8c including Hartmann pattern plates, respectively, and controller 9. The CCD has two-dimensional spatial resolution. The Hartmann pattern plates lead inspection lights of the inspection lights passing through lenses 18 and 18 of the eye glass unit 16 supported at the setting section 20 to the respectively corresponding CCDs 7d and 8d. The controller 9 performs various arithmetic processings for calculating the optical characteristics of the lenses 18, 18 and controlling driving of various parts based on light intensity distributions obtained by CCDs 7d and 8d, respectively. A part of the inspecting optical systems 7c and 8c and a part or an entire part of the CCDs 7d, 8d and the controller 9 may be provided in the rear casing body 3.

A pair of the lenses of the eye glass unit are accurately located along the optical paths of a pair of right and left measuring optical systems positioned in right and left portions of the apparatus body, respectively. The measuring optical system comprises a light-projecting optical system (illuminating optical system) housed in the upper casing body and a light-receiving optical systems housing in the lower casing body.

The left light-receiving optical system comprises LEDs 7a1 and 7a2, collimator lenses 7b1 and 7b2, and a dichroic mirror 7b3. The LED 7a1 emits infrared light, and LED 7a2 emits red light (wavelength: 630 nm). The dichroic mirror 7b3 reflects the infrared light, and transmits the red light The collimator lenses 7b1 and 7b2 convert the spreading light fluxes from the LEDs 7a1 and 7a2 to parallel light fluxes as the inspection lights, respectively.

The left light-receiving optical system comprises a Hartmann pattern plate 7c1, a field lens 7c2 having a screen face 7c2', reflecting mirrors 7c3, 7c3', an optical path synthesis prism 7c4, an image-forming lens 7c5 and a CCD (light-receiving element, light receiver) 7d as an image-forming element. The pattern plate 7c1 has a number of light-transmitting portions (not shown) in a matrix-shaped manner. The light-transmitting portions may be through-holes or an array of numerous lenses. By this construction, the pattern plate 7c1 can divide the measuring light flux into a number of discrete measuring light fluxes.

The axis of a lens-receiving axis of an eye glass unit-supporting mechanism mentioned later is set parallel to the measuring optical axis of the measuring optical system.

The right measuring optical system comprises a light-projecting optical system (illuminating optical system) housed in the upper casing body and a light-receiving optical systems housing in the lower casing body.

The left light-receiving optical system comprises LEDs 7a1 and 7a2, collimator lenses 7b1 and 7b2, and a dichroic mirror 7b3. The LED 7a1 emits infrared light, and LED 7a2 emits red light (wavelength: 630 nm). The dichroic mirror 7b3 transmits the infrared light, and reflects the red light. The collimator lenses 7b1 and 7b2 convert the spreading light fluxes from the LEDs 7a1 and 7a2 to parallel light fluxes as the inspection lights, respectively.

The right light-receiving optical system comprises a Hartmann pattern plate 8c1, a field lens 8c2 having a screen face 8c2', a reflecting mirror 8c3, an optical path synthesis prism 8c4, an image-forming lens 8c5 and a CCD (common CCD for the left measuring optical system) 8d. The pattern plate 8c1 has a number of light-transmitting portions (not shown) in a matrix-shaped manner. The light-transmitting portions may be through-holes or an array of numerous lenses. By this construction, the pattern plate 8c1 can divide the measuring light flux into number of discrete measuring light fluxes. The axis of a lens-receiving axis of an eye glass unit-supporting mechanism mentioned later is set parallel to the measuring optical axis of the measuring optical system. Since the common CCD (7d, 8d) is used as light-receiving elements of the right and left measuring optical systems, the refractive characteristics of the right and left lenses of the eye glass unit can be almost simultaneously measured by a smaller number of the optical parts.

Further, according to this embodiment, the common CCD is employed as the light-receiving elements for the right and left measuring optical systems, but independent CCDs may be separately provided for the right and left measuring optical systems, respectively. In this case, the refractive characteristics of the right and left lenses of the eye glass unit can be completely simultaneously measured.

(Control Circuit)

Further, outputs from the CCD 7d(8d) are led to an arithmetic control circuit 9, and outputs from this arithmetic control circuit 9 is led to a control apparatus CPU (personal computer). An operation lever (not shown) is provided at a side wall of the casing 4, and a sensor (not shown) is provided to detect whether or not the operation lever is pulled down horizontally so that outputs from the sensor may be inputted into the arithmetic control circuit 9.

Figure 4:
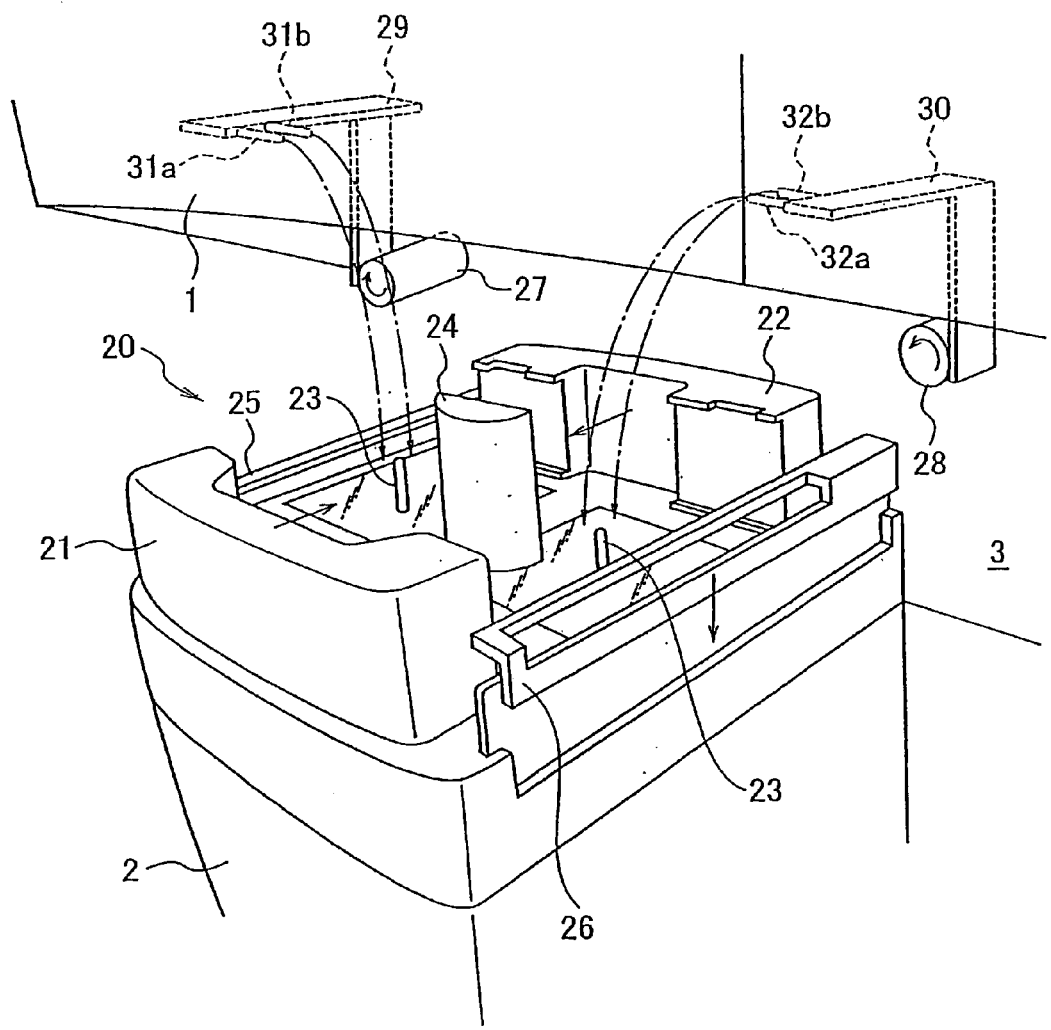
FIG. 4 is a perspective view showing details of a setting section of the lens meter shown in FIG. 1A.
Figure 5:
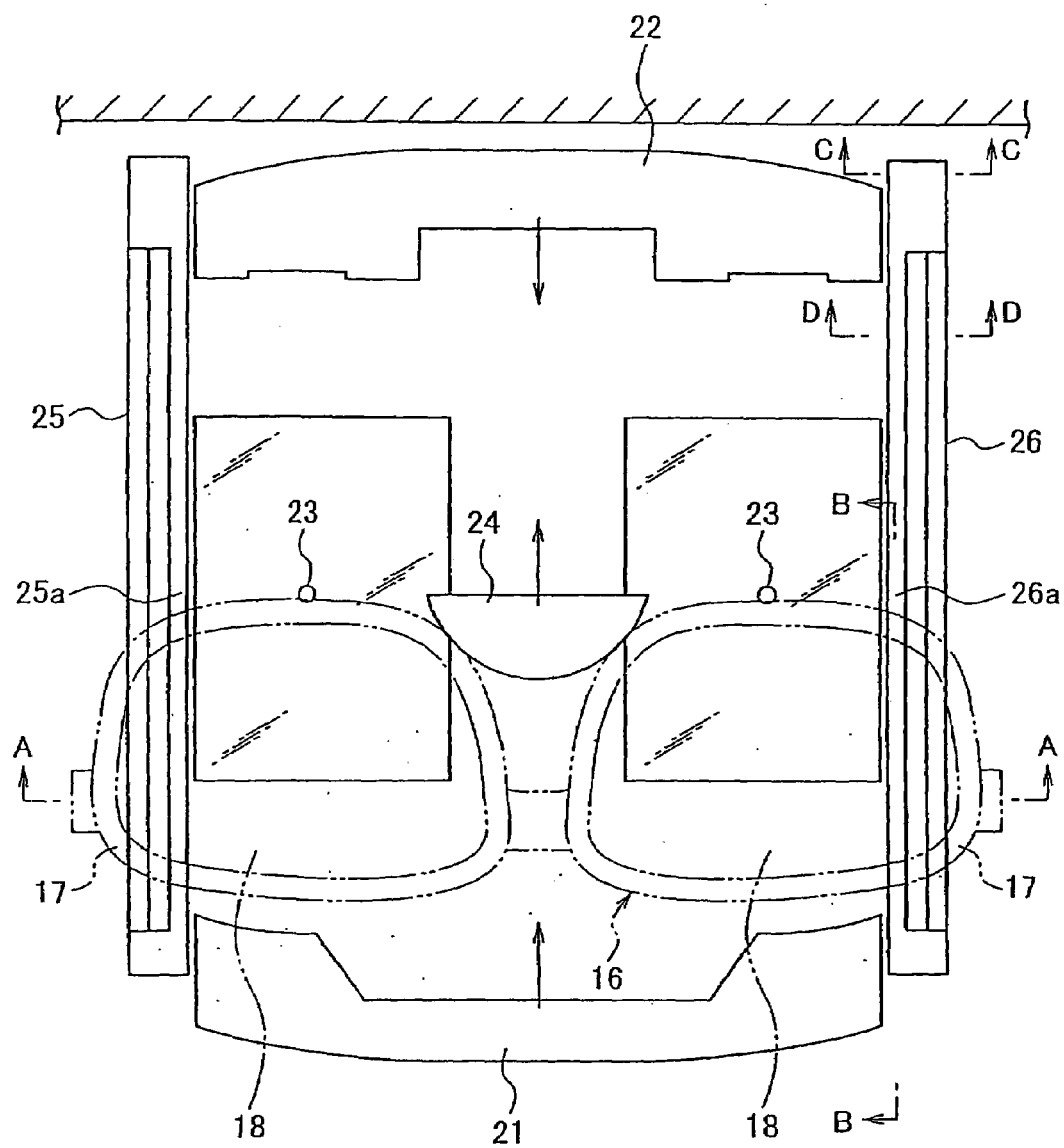
FIG. 5 is a plane view showing an initial state in which a product eye glass unit is set at the setting section shown in FIG. 4.
Figure 6A:
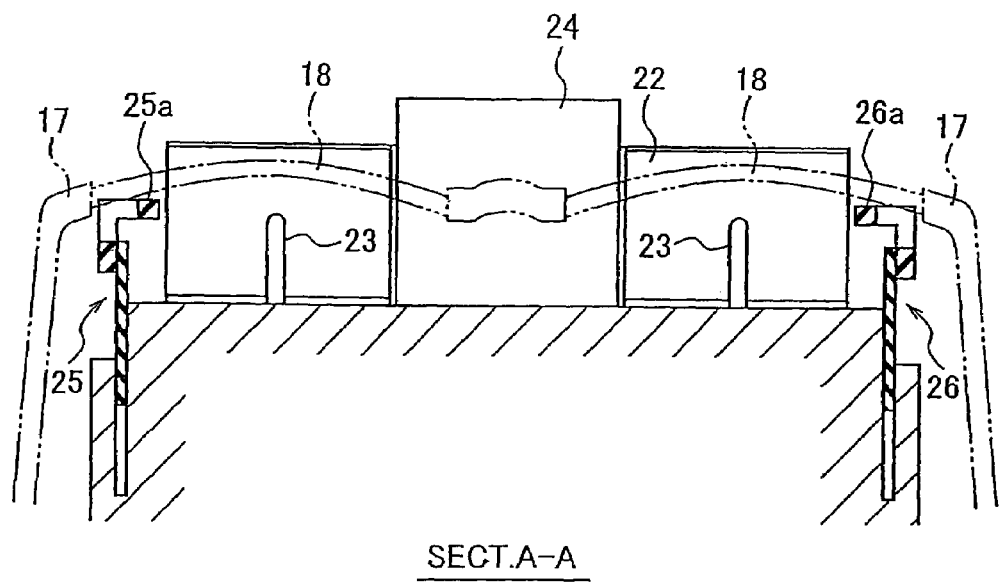
FIGS. 6(a) and 6(b) are sectional views of FIG. 5 along with sectional lines A-A and B-B, respectively.
Figure 6B:
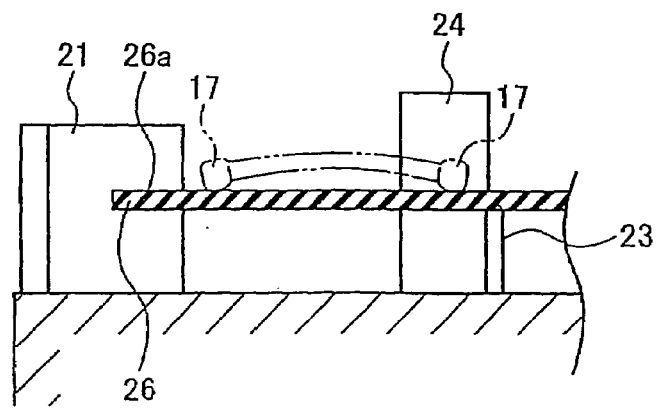

As shown in a detailed perspective view of FIG. 4, two sandwiching members 21, 22 are arranged apart from each other at front and rear sides of the lens meter 100, respectively. Two sandwiching members 21 and 22 are displaceable nearer to or farther from each other. As shown in FIG. 5 and FIGS. 6(a) and 6(b) in section, an eye glass unit 16 can be almost horizontally disposed between both the sandwiching members 21 and 22 (the optical axis of each of lenses 18 being directed in vertical directions against a paper).

Two sandwiching members 21 and 22 are connected together by means of a connecting member (not shown) so that they may be displaced simultaneously in opposite directions and by almost the same displacing amount, interlocking with each other. Therefore, the middle point between both the sandwiching members 21 and 22 is always kept constant as viewed in front and rear directions irrespective of whether the space between the sandwiching members 21 and 22 is narrow or wide. A known connecting mechanism as described in detail in JP-A 2003-194670, etc. can be used as a connecting mechanism for the sandwiching members 21 and 22 by this connecting member.

Figure 7:
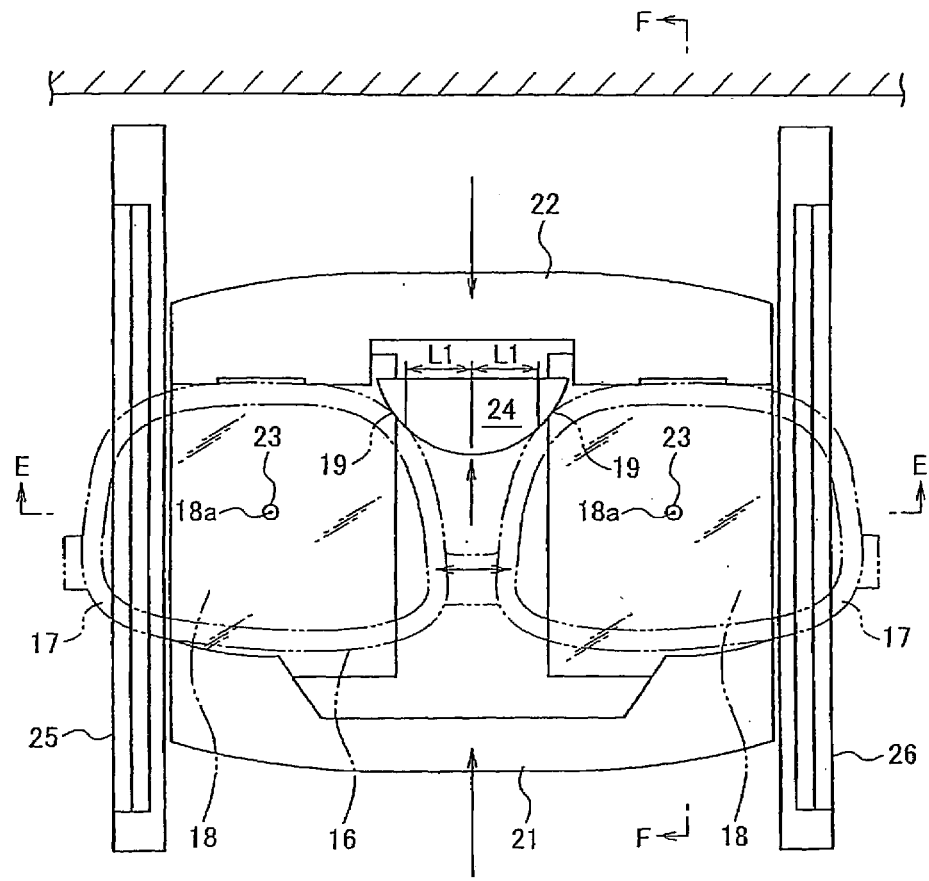
FIG. 7 is a plane view showing a state in which the product eye glass unit placed at the product eye glass unit is sandwiched.

As the connecting member, one shown by a reference numeral 40 (40a, 40b) in FIGS. 6 and 7 of U.S. Pat. No. 6,778,264A2 may be used.

Supporting pins 23 and 23 are erected at a setting section 20 to face lower surfaces (those surfaces of the lenses which are directed to a human face when a person wears the eye glass unit) of the respective lenses 18 when the eye glass unit 16 is set. The supporting pins 23 and 23 receive the right and left lenses 18, 18 of the eye glass unit 16 from their lower face sides, respectively. The supporting pins 23 and 23 are arranged in almost middle points between both the sandwiching members 21 and 22 as viewed in the front and rear directions.

The supporting pins 23 and 23 are provided at locations corresponding to centers of detecting zones of the two CCDs 7d and 8d (in this embodiment, the common CCD being used) arranged for the left and right lenses, respectively.

As viewed in FIGS. 5 and 7, the width of a lower side portion of a frame 17 for the lenses 18 of the eye glass unit 16 is almost equal to that of an upper side portion of the frame 17 for the lenses 18. Thus, the optical axes of the lenses 18, 18 of the eye glass unit 16 are almost in conformity with the locations of the two corresponding pins 23 and 23, respectively, as viewed in the front and rear directions, in the state that the eye glass unit 16 is sandwiched between the sandwiching members 21 and 22 as shown in FIG. 7. In other words, the positional relationship between the sandwiching members 21, 22 and the supporting pins 23, 23 is so set that the optical axes 18a and 18a of the lenses 18 and 18 of the eye glass unit 16 may be located on a line connecting the two supporting pins 23, 23.

In addition, since the supporting pins 23 and 23 are arranged corresponding to almost the centers of the detecting zones of the CCDs 7d and 8d, respectively, transmitted lights passing the respective lenses 18 and 18 of the eye glass unit 16 enter almost the centers of the respective detecting zones of the corresponding CCDs 7d and 8d. Two sandwiching members 21 and 22 appropriately automatically locate the eye glass unit 16 as viewed in the front and rear directions at the setting section 20.

Frame supports 25 and 26 each having a reverse L-letter shape are arranged at oppositely outer sides of the sandwiching members 21 and 22, extending almost orthogonally to the sandwiching members 21 and 22. The frame supports 25 and 26 are moved up and down between a position where the upper faces 25a and 26a are positioned higher than the tops of the supporting pins 23 and 23 and a position where the upper faces 25a and 26a are positioned not higher than the tops of the supporting pins 23 and 23. The frame supports are urged to the position, by means of springs 65 (See FIGS. 11(a) and 11(b)) mentioned later, where the upper faces 25a and 26a are positioned higher than the tops of the supporting pins 23 and 23.

As shown in FIG. 5 and FIG. 6(b), the frame 17 of the eye glass unit 16 to be measured is placed on the upper faces 25a and 26a of the frame supports 26 and 26. At that time, at least two portions of the frame 17 contact each of the upper faces 25a and 26a of the frame supports 25 and 26 for the left and right lenses 18, 18, respectively. Thus, the eye glass unit 16 is supported at totally at least four points on the frame supports 25 and 26, so that the setting posture of the eye glass unit 16 can be maintained in a stabilized state.

Between the sandwiching members 21 and 22 is arranged a nose pad-supporting member 24 at almost a central portion as viewed in a lateral direction. The nose pad-supporting member 24 has a circular arc-sectional peripheral face at a side opposed to the front sandwiching member 21. The nose pad-supporting member 24 is slidable from almost the central position illustrated as viewed in the front and rear directions, i.e., in a longitudinal direction, to a rear side. The supporting member 24 is urged to the position shown by a spring not shown. As shown in FIG. 7, when the sandwiching members 21 and 22 sandwich the eye glass unit 16 in cooperation with each other from the front and rear sides, respectively, the cylindrical arc-shaped peripheral face of the nose pad-supporting member 24 contacts nose pads 19 and 19 of the eye glass unit 16 and presses the nose pads corresponding to the urging force.

At that time, since the posture of the eye glass unit 16 is autonomously changed 80 that the pressing forces upon the right and left nose pads 19, 19 may be uniform. Ultimately, the right and left portion contacts are stably set at positions apart from the center of the setting section 20 by distance L1, L1 as viewed in right and left directions, so that eye glass unit 16 is automatically centered at the setting section 20 in the lateral direction.

The urging force of the nose pad-supporting member 24 is set smaller than a rearward pressing force of the front sandwiching member 21 upon the eye glass unit 16, so that the nose pad-supporting member 24 is pushed back with the pressing force of the front sandwiching member 21 received via the right and left nose pads 19, 19 of the eye glass unit 16.

On the other hand, as shown in FIG. 4, cylindrical members 27 and 28 which can turn in directions shown by arrows, respectively, are provided inside the rear casing body 3, and rotary arms 29 and 30 each having an almost reversed L-letter shape and extending upwardly and being bent toward the front side as shown in FIG. 4 are joined to the cylindrical members 27 and 28, respectively. Near front tips of the rotary arms 29 and 30 are formed a pair of push pins 31a and 31b and a pair of 32a and 32b which extend horizontally and project toward the opposed rotary arms 29 and 30, respectively.

When the cylindrical members 27 and 28 are turned as shown by the arrows, respectively, the rotary arms 29 and 30 connected to the cylindrical arc members are turned, respectively. Consequently, two pairs of the push pins 31a, 31b and 32a, 32b are butted against the respective lenses 18, 18 of the eye glass lens 16 arranged above the support pins 23 and 23, so that the push pins push the lenses 18, 18 downwardly (strictly speaking, in an arc direction tangentially downwardly) against the urging forces of the frame supports 25, 26.

As shown in FIG. 8 in section, turning of the cylindrical members 27 and 28 is stopped in the state that the lenses 18, 18 are sandwiched by the support pins at the under side of the lenses and the push pins 31a, 31b, 32a, 32b at the upper side of the lenses, thereby definitely vertically locating the lenses 18, 18.

When the push pins 31a, 31b, 32a, 32b push the lenses 18, 18 downwardly, the frame supports 25 and 26 receive downward press forces via the frame 17 of the eye glass unit 16. Thereby, the frame supports are downwardly pushed down by the length of a gap existing primarily between the lower faces of the lenses 18 and the support pins 23.

As mentioned above, the setting section 20 is designed such that the eye glass unit 16 is set (or supported) at a given measuring position with respect to the vertical direction, the lateral directions and the longitudinal direction.

As shown in FIG. 10(a) in section, that length area of the frame support 26 where the frame 17 of the eye glass unit 16 is not disposed (a portion near a line C-C in FIG. 5, for example) has an almost inversed L-letter sectional shape. As shown in FIG. 10(b) in section, that length area of the frame support 26 where the frame 17 of the eye glass unit 16 may be disposed (a portion around a line D-D in FIG. 5), a notch 26b which penetrates the frame support 26 is formed at a corner of the almost L-letter shape section. Although not shown, a same notch is formed in the other frame support 25.

Since an outermost portion of each of the frame supports 25, 26 is cut out in such a manner, this prevents an incident that if an eye glass unit 16 having a narrow width between right and left hangers is to be measured, one of the hangers, not the frame of the eye glass unit 16, would ride over the frame support 25 or 26 and thereby the eye glass unit 16 would be set inclinedly. Thus, even such an eye glass unit having the narrow width between the hangers can be disposed on the setting section in a correct posture.

Further, as shown in FIG. 10(b), a frameless eye glass unit comprises lenses 18 and hangers 17a connected together by means of connecting pins 17b. The connecting pins 17b pass the respective lenses 18, and projects toward the frame supports 25, 26. In addition, since the connecting pins 17b are attached to the respective lenses 18, the pins are located at widthwise inner sides than the right and left outer sides of the framed eye glass unit. Therefore, the hanger is likely to ride over the frame support 25 or 26. If the connecting pin 17b rides over the frame support 25 or 26, it may be that the eye glass unit is inclinedly supported or that the supporting position of the eye glass unit is deviated by the downward pressure from the pressing pins 31a, 31b, 32a, 32b.

However, since the notch 26b is formed in the above manner, the connecting pin 17b enters the notch 26b. This prevents the incident that the eye glass unit 16 is inclinedly set in the state that the connecting pin 17b rides over the frame support 25 or 26. Accordingly, the eye glass unit can be disposed in an appropriate posture.

If the width W1 of the lower casing body 2 in the lateral direction is sufficiently made smaller than that W2 of the eye glass lens, the same effect as in the case that the width between the frame supports 25 and 26 is set narrower and the notches 25b and 26b are formed can be obtained. On the other hand, since the CCDs 7d and 8d extending two-dimensionally are arranged in the lower casing body 2, the detecting areas of the CCDs 7d and 8d become narrower, so that spatial resolution of the measuring results may be deteriorated.

Therefore, the formation of the above-mentioned notches 25b and 26b can stabilize the eye glass unit 16 without narrowing the detecting areas of COD 7d, 8d, i.e., reducing the spatial resolution of the measured results.

Next, a lift mechanism of two-stage lift type light-shielding members 53 and 54 provided in the upper casing body 1 will be explained with reference to the sectional views of a principal portion in FIGS. 11(a) and 11(b) and FIGS. 12(a) and 12(b).

First, inside the rear casing body 3 are arranged a feed screw 61, a vertically movable nut 62, a lift base member 51, a swing member 52, a stopper plate 63, and a support press-down member 64. The feed screw 61 extends vertically, and is turned upon receipt of a driving force from a driver such as a motor not shown. A rear end 53a of the first light-shielding member 53 mentioned later is joined to the lift base member 51. A rear end 54a of the second light-shielding member 54 is joined to a tip portion 52a of the swing member 52, and the rear end 52a is axially supported by the lift base member 51. A rear portion 54a of the second light-shielding member 54 is joined to a tip end 52b of the swing member 52. A rear end portion 52a of the swing member 52 is axially supported by the lift base member 51. A disposing portion 52e of the swing member 52 contacts an upper face of the nut 62 due to its self weight. When the lift base member 51 moves downwardly, a stopper plate 63 contacts a lower end 51b of the front wall 51c of the lift base member 51. One end (first end) 64a of the support press down member 64 contacts the lower face of the descended nut 62, and the other end (second end) 64c contacts upper faces of rear end portions 25c and 26c of the frame supports 25, 26. The support press-down member 64 turns around an axially supporting portion 64b between opposite ends 64a and 64c as its rotary center.

The lift base member 51 is constructed such that it is movable up and down only along a guide vertically extending (not shown), while maintaining its posture.

The swing member 52 passes an opening 51a formed in the front wall 51 of the lift base member 51. The swing member 52 can be vertically swung around a rear end 52a portion as its turning center between upper and lower edges of the opening 51a.

Further, since the outer periphery of the nut 62 would interfere with front wall 51c and side wall of the lift base member 51, etc. during rotation, the nut is made vertically movable relative to the feed screw 61 under rotation without turning together with the feed nut 61.

A spring 65 is arranged on a lower face side of the rear end 25c, 26c of the frame support 25, 26 for urging the frame support 25, 26 upwardly.

The first light-shielding member 53 formed in a cup-like sectional shape is arranged inside the upper casing body 1, while extending along the inner periphery of the upper casing body 1. Further, the second light-shielding member 54 having a cup-like sectional shape is arranged inside the first light-shielding member 53.

Figure 11A:
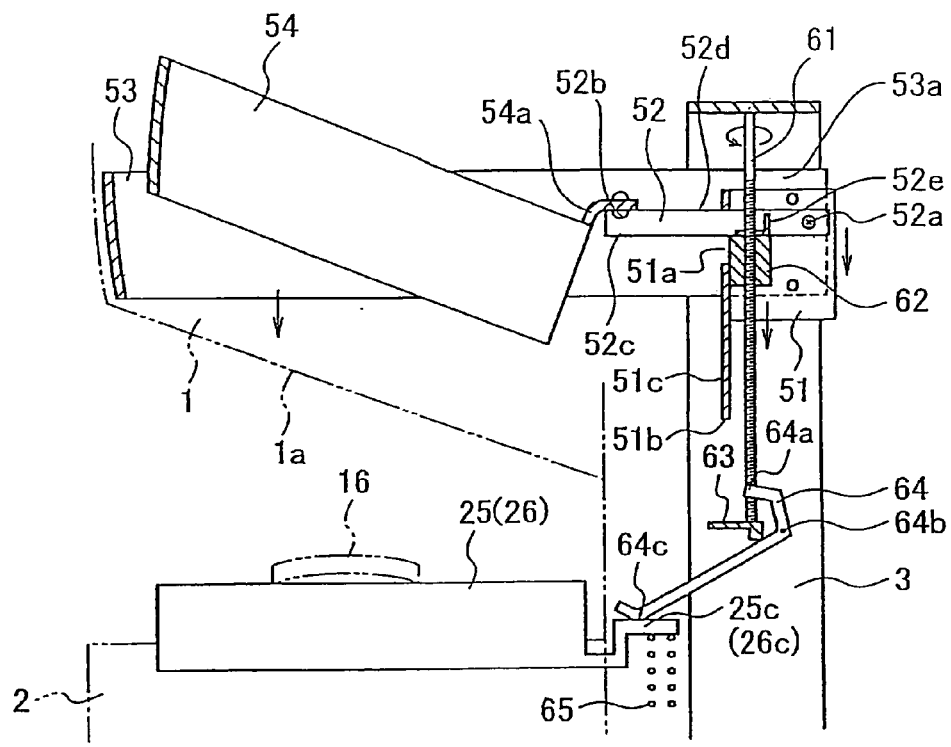
FIGS. 11(a) and 11(b) are schematic views showing the construction and function of a lift mechanism for a light-shielding member and a frame support (No. 1).

As shown in FIGS. 1A and 11(a), each of the light-shielding members 53 and 54 is housed in the upper casing body 1 and is not seen from outside except a measuring time period in which the light characteristics of the lenses 18 of the eye glass unit 16 are measured.

One other hand, the light-shielding members are descended from the lower end 1a of the upper casing body 1 during the time period for measuring the optical characteristics of the lenses 18, so that they cover around an upper space of the eye glass unit 16 set at the setting section 20 and suppress external side light (noise light) from entering the glasses 18 of the eye glass unit 16.

Next, up and down movement of the light-shielding members 53, 54 with the lift mechanism and the up and down movement of the frame supports 25, 26 will be explained.

First, as shown in FIG. 11(a), the nut 62 is positioned at an upper portion of the feed screw 61. The upper face of the nut 62 A contacts the disposing portion 52e of the swing portion 52, thereby supporting the swing member 52 from the lower side. Further, since the rear end 52a of the swing member 52 is axially supported by the lift base member 51, the supporting force received from the nut 62 functions as a rotary moment in a clockwise rotating direction upon the lift base member 51. As a result, the upper face 52d of the swing member 52 ahead of the disposing portion 52e contacts the upper edge of the opening 51a formed in the front wall 51c of the lift base member 51 to upwardly press the upper edge of the opening 51a.

Since the lift base member 51 is movable only vertically without changing its posture, a portion of the lift base member 51 that axially supports the rear end portion 52a of the swing member 52 and the upper edge of the opening 51a are upwardly pushed. Thus, the lift base member 51 is supported by the nut 62 via the swing member 52.

The first light-shielding member 53 connected to the lift base member 51 and the second light-shielding member 54 connected to the swing member 52 are housed in the upper casing body 1, while being located above the lower edge 1a of the upper casing body 1.

Figure 11B:
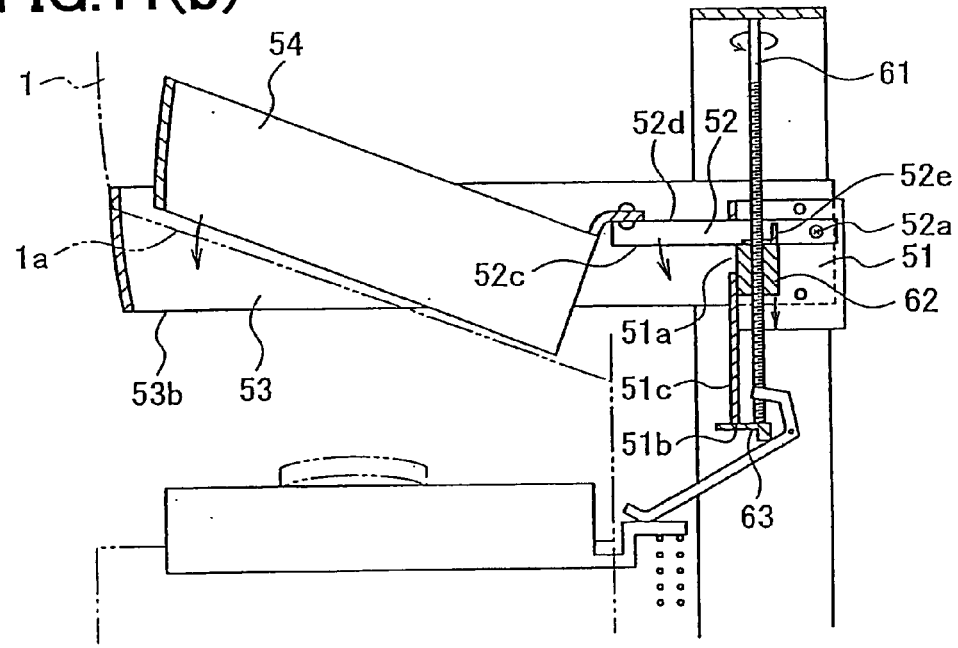

Next, when the feed screw 61 is turned in a given direction by a driver not shown, the nut 62 is descended as shown in FIG. 11(b). As the nut 62 is descended, the lift base member 51 and the swing member 52 are lowered without changing the relatively positional relationship between the members 51 and 52.

Thereby, the first light-shielding member 53 connected to the lift base member 51 is descended in parallel, so that the member 53 projects downwardly from the lower edge 1a of the upper casing body 1. The second light-shielding member 54 is located above the lower edge 1a of the upper casing body 1, and housed inside the upper casing 1.

When the lower end 51b of the front wall 51c of the lift base member 51 is lowered to a position where the lower end 51b contacts the stopper plate 63, lowering of lift base member 51 is stopped (FIG. 11(b)).

Figure 12A:
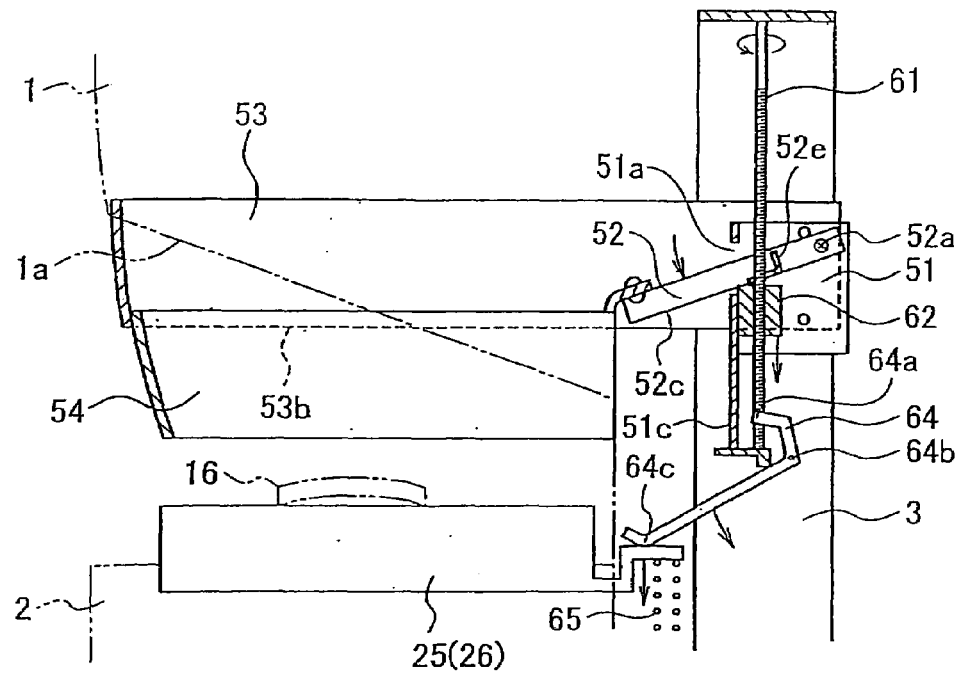
FIGS. 12(a) and 12(b) are schematic views showing the construction and function of the lift mechanism for the light-shielding member and the frame support (No. 2).

When the nut 62 is lowered from this state by turning the feed screw 61, as shown in FIG. 12(a), the disposing portion 52e of the swing member 52 is lowered due to the self weight of the swing member 52 as the nut 62 is lowered, whereas the rear end portion 52a as the axially supported portion with the lift base member 51 which stops descending is not lowered. Consequently, the swing member 52 turns around the rear end portion 52a as its rotary center counterclockwise as shown. At that time, the swing member 52 is turned until its lower edge 52c contacts the lower edge of the opening 51a of the lift base member 51.

By this, the second light-shielding member 54 connected to the swing member 52 is turned together with the swing member 52, and projects from the lower edge 53a of the first light-shielding member 53.

By the above operation, the two-stage lift type light-shielding members 53 and 54 are successively projected, and the projected light-receiving members 53 and 54 shield external light from entering the upper space of the eye glass unit 16 set at the setting section 20 from the side direction.

Since the second light-shielding member 54 is down only to a position just beside the eye glass unit 16, the light-shielding member 54 does not completely cover the upper space of the eye glass unit 16. The light fluxes led to the CCD 7d, 8d by the light-detecting optical systems 7c and 8c disposed inside the lower casing body 2 are limited to those in a given incident angle range. As a result, light shielding with the light-shielding members 53 and 54 can shield external light having a relatively small incident angle with respect to the lens 18 of the eye glass unit 16 (angle with respect to the optical axis). Thereby, the external light-shielding function can be sufficiently attained.

Further, the second light-shielding member 54 is only placed on the upper face of the nut 62 via the swing member 52, and is descended merely due to the self weights of the second light shielding member 54 and the swing member 52. Since the shielding member is not pushed down by driving force of a driver, the second light-shielding member 54 can be easily pushed up even in the descending state (FIG. 12(a)) by pressing up the member 54 with a load greater than the self weights of the second light-shielding member 54 and the swing member 52 from the lower side.

The first shielding member 53 is merely disposed on the upper face of the nut 62 via the lift base member 61 and the swing member 52, and is lowered merely by the self weights of the first light-shielding member 53, the lift base member 51, the swing member 52 and the second light-shielding member 54. Since the first light-shielding member 53 is not pushed down by driving force of a driver, the first light-shielding member 53 can be easily pushed up even in the descending state (FIG. 12(a)) by pressing up the member 53 with a load greater than the total self weight of the above from the lower side.

Therefore, even if a finger or the like of an operator enters the descending zone of the light-shielding members 53 and 54 through operator's erroneous action, no forcedly descending load is applied to the light-shielding members 53 and 54 at a location other than the place where the light-shielding members 53 and 54 are butted to the finger or the like.

Figure 12B:
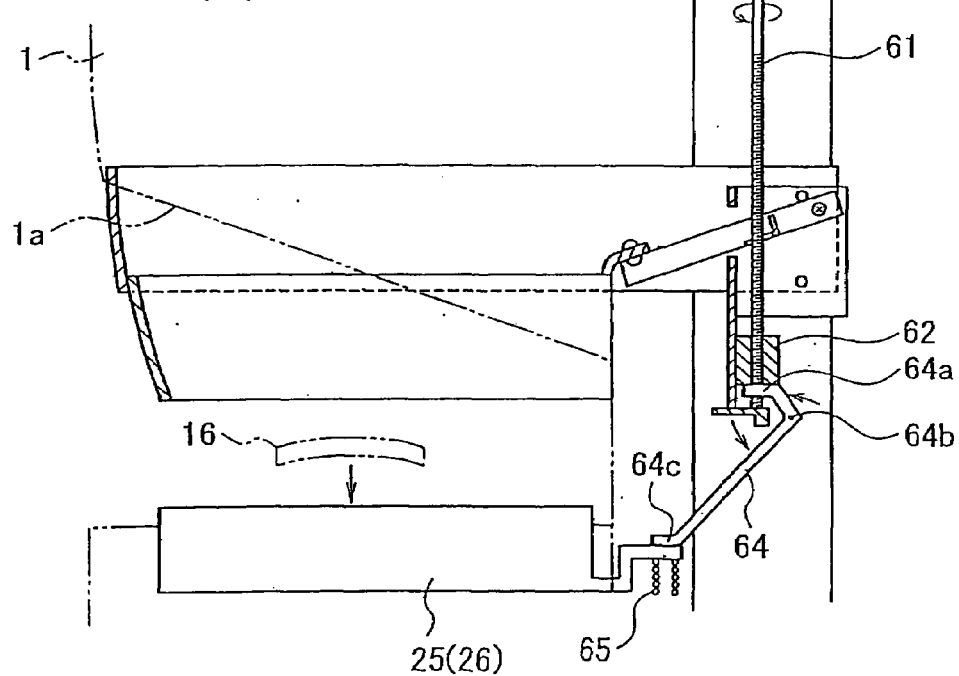

When the nut 62 is descended from the above state by further turning the feed screw 61, as shown in FIG. 12(b), the lower face of the nut 62 pushes down the first end portion 64a of the support push-down member 64. Consequently, the support push-down member 64 is turned around the axially supported portion 64a as its rotary center, and the second end portion 64c presses down the upper face 25c, 26c of the frame support 25, 26 against the urging force of the spring 65, thereby descending the fame support 25, 26.

In the above, the descending operation of the light-shielding members 53 and 54 and the descending operation of the frame supports 25, 26 with the lift mechanism are explained. The ascending operation can be performed through successively reversely effecting the above descending operation by reversely turning the feed screw 61 with the driver from the position shown in FIG. 12(b).

Figure 14A:
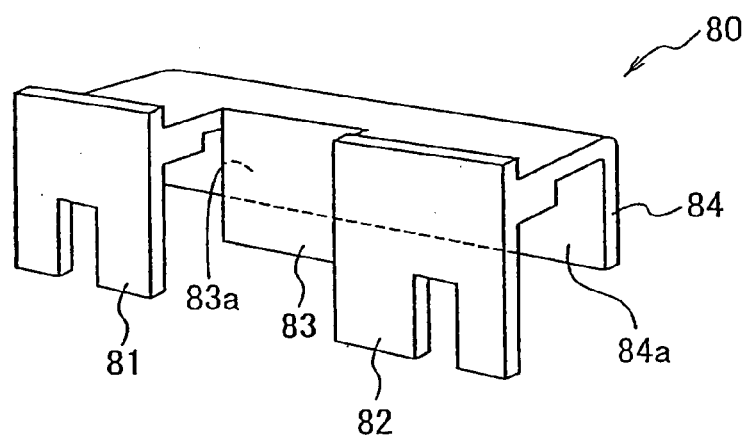
FIGS. 14(a) and 14(b) are perspective views of inspection glass frame adaptors, illustrating one for a rear sandwiching member and another for a front sandwiching member, respectively.
Figure 14B:
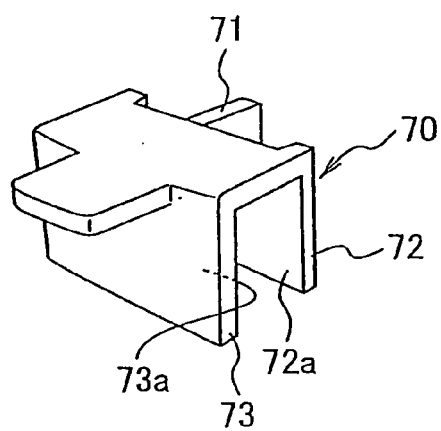

FIGS. 14(a) and 14(b) are perspective views showing trial frame adaptors (inspection glass frame adaptors) 80, 70, respectively, which are used when optical characteristics of an inspection glass unit 10 in which the detachable lenses 12 shown in FIG. 13(b) are fitted to the trial frame 11 (inspection glass frame) shown in FIG. 13(a).

Figure 15:
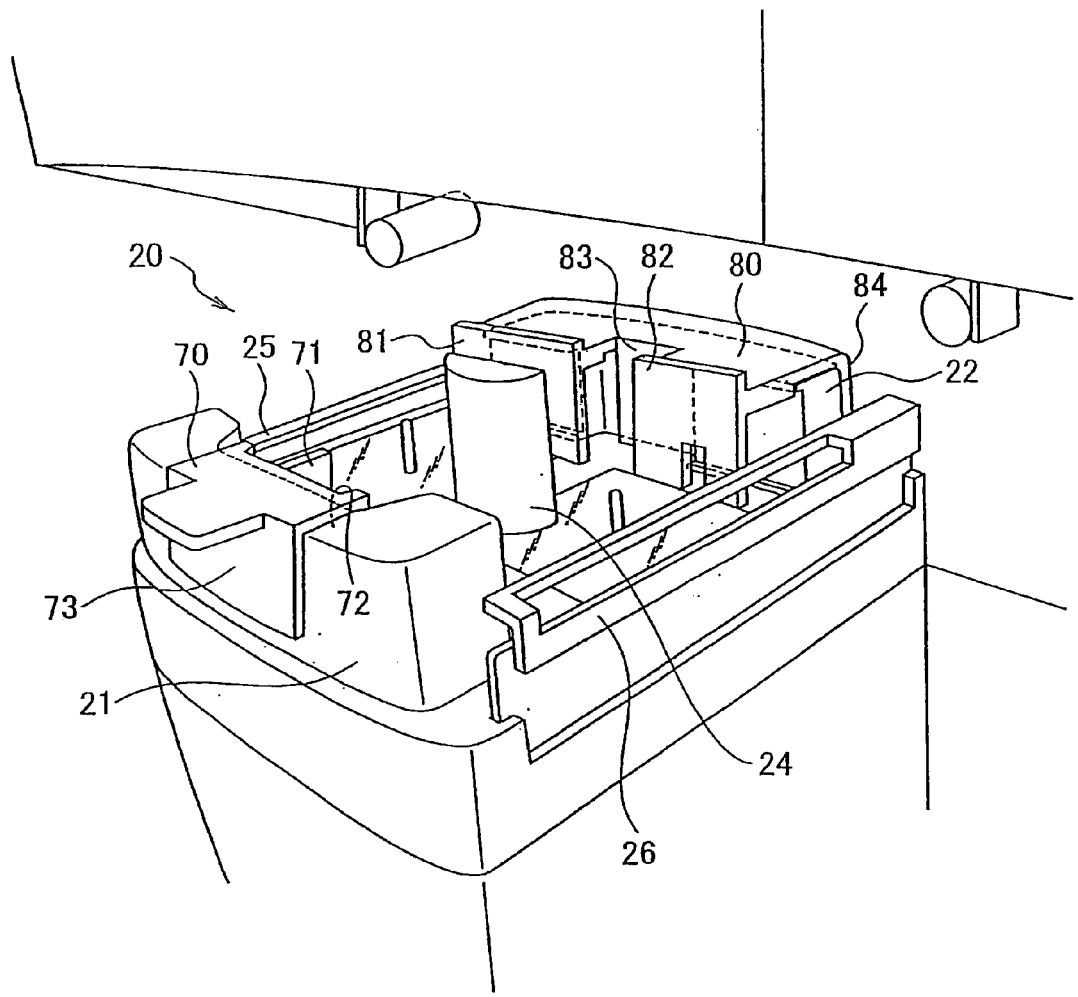
FIG. 15 is a perspective view showing a state in which inspection glass frame adaptors are fitted to the sandwiching members, respectively.

As shown in FIG. 15, the adaptor 80 of FIG. 14(a) is placed over the rear sandwiching member 22 at the setting section 20 from an upper side, whereas the adaptor 70 of FIG. 14(b) is placed over the front sandwiching member 21 at the setting section 20 from the upper side. Each of the adaptors is uniquely located through being engaged with a part of a contour shape of the corresponding sandwiching member 21, 22 as viewed in a plane.

That is, the adaptor 80 is so designed that an inner face 84a of a rear wall 84 almost contacts a rear face (a back face opposed to a face facing the other sandwiching member 21) of the rear sandwiching member 22, whereas an inner face 83a of a front central wall 83 contacts a recessed face formed in a central portion of a front face (the face opposed to the other sandwiching member 21) of the rear sandwiching member 22.

Similarly, the adaptor 70 is so designed that an inner face 73a of a front wall 73 almost contacts a front face (a face opposed to another facing the other sandwiching member 22) of the front sandwiching member 21, whereas an inner face 72a of a rear wall 72 contacts a recessed face formed in a central portion of a rear face (a face opposed to the other sandwiching member 21) of the front sandwiching member 21.

When the adaptors 70 and 80 are fitted to the respective sandwiching members 21 and 22, the adaptors project oppositely toward the respectively opposed sandwiching members 21 and 22. The adaptors 70 and 80 have projecting sandwiching portions 71 and 81 and 82, respectively, which are to be butted against those portions of the trial frame 11 which are other than the movable ranges of the tabs 12c of the detachable lenses 12 projecting from the trial frame 11 of the inspection glass unit 10 supported as the glass unit. The other portions of the adaptors than the projecting sandwiching portions 71, 81 and 82 are designed to not interfere with the movable ranges of the tabs 12c.

Figure 16:
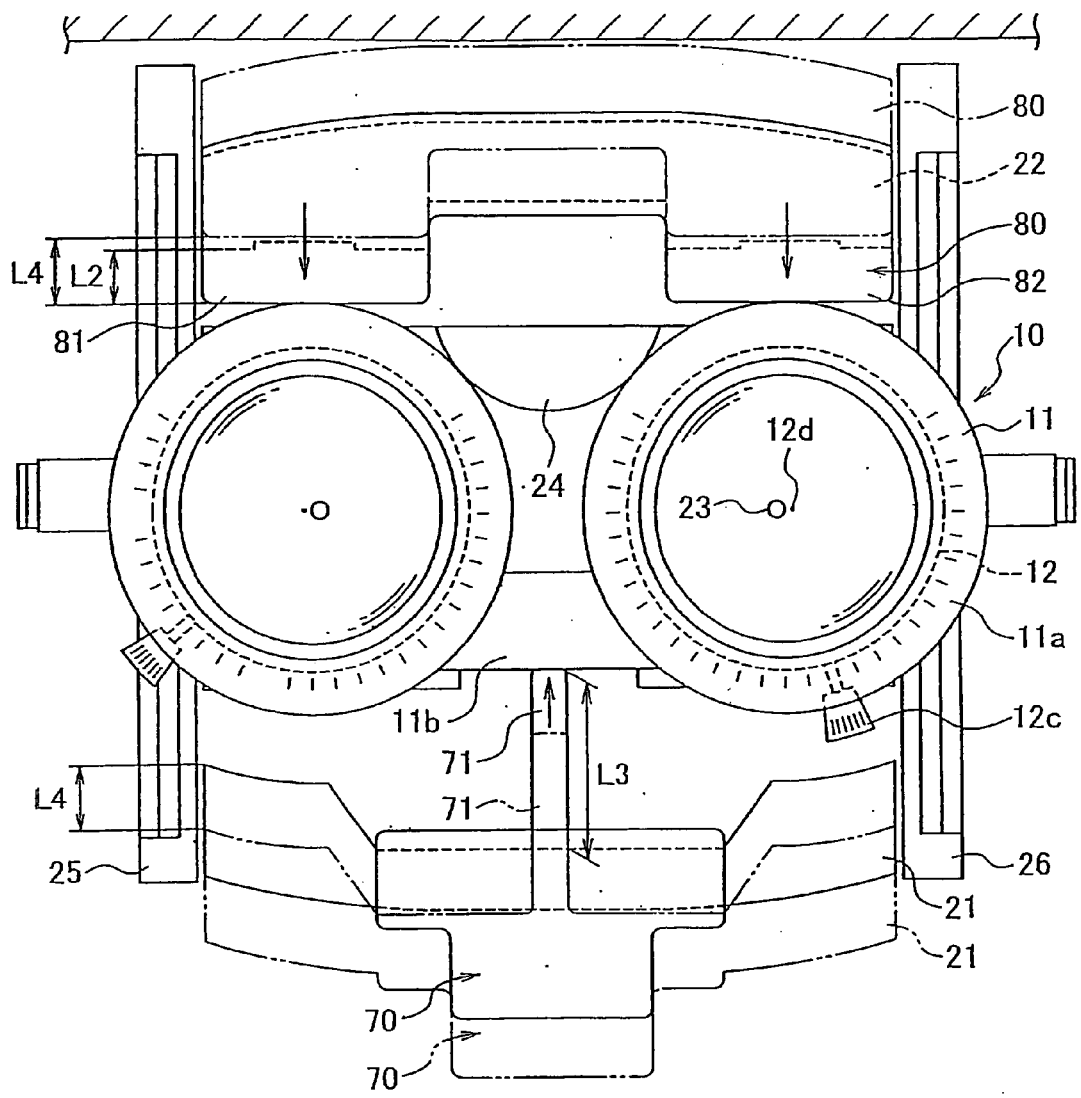
FIG. 16 is a plane view showing a state in which the inspection glass unit is sandwiched at the setting section shown in FIG. 15.

That is, more specifically, as shown in the plane view of FIG. 16, the projecting sandwiching portion 71 of the adaptor 70 contacts almost a central portion of a lateral connecting portion 11b of the trial frame 11, whereas the projecting sandwiched portions 81 and 82 of the adaptor 80 contact right and left lower edges of the trial frame 11 other than the movable ranges of the tabs 12c.

The projecting length L3 of the projecting sandwiching portion 71 of the adaptor 70 from the central portion of the rear side of the front sandwiching member 21 and the projecting length L2 of the projecting sandwiching portions 81 and 82 of the adaptor 80 from the projected front face of the rear sandwiching member 22 are set such that when the sandwiching members 21 and 22 are displaced by the same distance of L4 in the opposite directions, interlocking with each other, the optical axes 12d, 12d of the lenses 12, 12 of the inspection glass unit 10 sandwiched by the projecting sandwiching portions 71, 81 and 82 may be aligned on a straight line connecting the support pins 23, 23.

As a result, the transmitted lights passing the optical axes 12d, 12d of the respective lenses 12, 12 of the inspection glass unit 10 enter almost the centers of the detecting zones of the corresponding CCDs 7d, 8d, respectively (In this embodiment, the common CCD is used as the CCDs 7d and 8d). The inspection glass unit 10 is automatically and appropriately located in the front and rear, i.e., longitudinal direction.

Since the adaptors 70, 80 are each formed almost in an inversed cup-like sectional shape when cut by a plane orthogonal to a longitudinal direction thereof, they can be fitted to the respective sandwiching members by simple operations that the adaptors 70 and 80 are placed over the sandwiching members 21 and 22 each having almost a quadric prism-like shape from their upper sides, respectively. The adaptors 70 and 80 can be detached from the sandwiching members 21 and 22, respectively, by simple operations that the former are pulled upwardly from the latter, respectively.

(Function)

Next, the function of the lens meter 100 according to the present embodiment will be explained.

First, the function will be explained in the case that the optical characteristics of the ordinary eye glass unit product 16 are measured. As shown in FIG. 4, the lens meter 100 is so set in the primary state that both the sandwiching members 21, 22 are set largely apart from each other, the frame supports 25, 26 are set urged upwardly, the press pins 31a, 31b, 32a and 32b are set retracted upwardly, and the light-shielding members 53 and 54 are housed inside the upper casing 1 as shown in FIG. 11(a).

In this primary state, as shown in FIG. 5 and FIGS. 6(a) and 6(b), the eye glass unit 16 is placed on the upper faces 25a and 26a of the frame supports 25 and 26, respectively, between the sandwiching members 21 and 22.

Next, when a measuring-start order is inputted into the operation button 6, an order input to the operation button 6 is inputted to the controller 9, which operates the driver not shown to move the sandwiching members 21 and 22 interlocking with and approaching to each other.

As shown in FIG. 5, the eye glass unit 16 which is first placed between the sandwiching members 21 and 22 is sandwiched there between as shown in FIG. 7, while contacting the nose pad-supporting member 24. Thus, the eye glass unit 16 is set at an appropriate measurement position as to the longitudinal direction and the lateral direction.

Then, the controller 9 drives a motor not shown to descend the light-shielding members 53 and 54 until positions shown in FIG. 12(a) by rotating the feed screw 61 of FIG. 11(a).

Figure 8A:
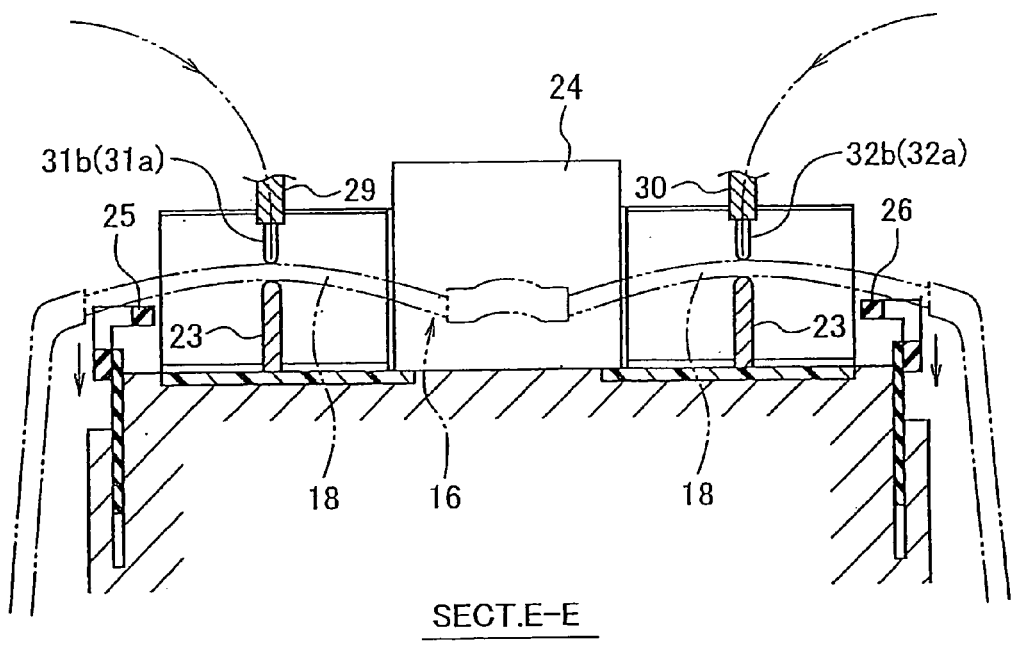
FIGS. 8(a) and 8(b) are sectional views of FIG. 7 along with sectional lines E-E and F-F, respectively.
Figure 8B:
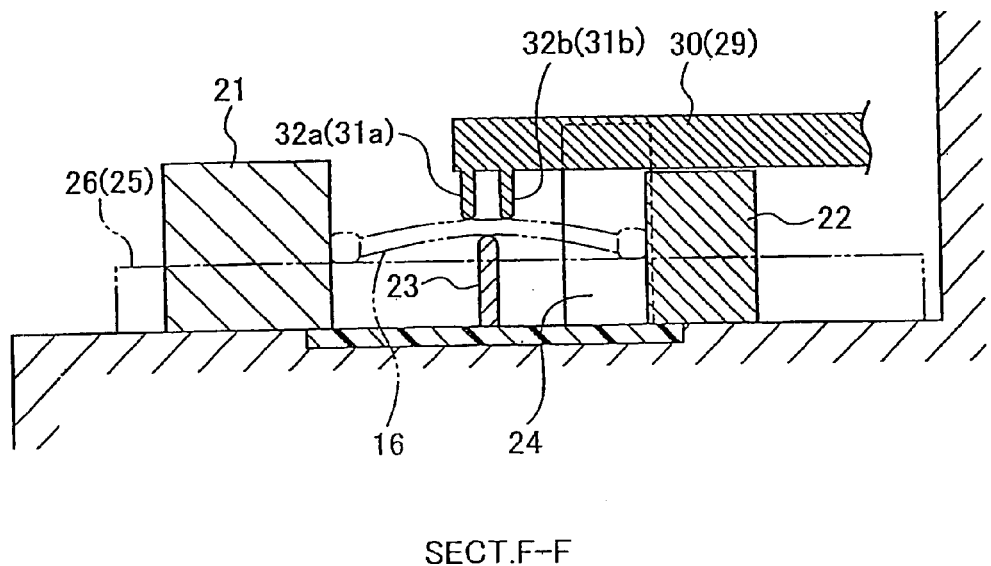

Parallel to the descending control of the light-shielding members 53 and 54, the driver is controlled to turn the columnar members 27 and 28 (See FIG. 4), so that the press pins 31a, 31b, 32a and 32b formed at the tips of the rotary arms 29 and 30, respectively, press down the lenses 18, 18, respectively until the lenses contact the support pins 23, 23 (See FIGS. 8(a) and 8(b)).

When the glasses are pressed down by the press pins 31a, 31b, 32a and 32b, the eye glass unit 16 is downwardly displaced, while being kept sandwiched with the sandwiching members 21 and 22. At that time, the frame 17 of the eye glass unit 16 slides on the sandwiching members 21 and 22.

As the eye glass unit 16 is displaced downwardly, the frame supports 25 and 26 are pressed and displaced down by a displaced distance of the eye glass unit 16.

Next, as shown in FIG. 12(b), when the nut 62 is further descended, the frame supports 25 and 26 are descended apart from the frame 17 of the eye glass unit 16.

The eye glass unit 16 is appropriately supported by the sandwiching members 21 and 22, the supporting pins 23, 23, and the press pins 31a, 31b, 32a and 32b. If non-uniform sliding occurs at the sliding areas between the frame 17 of the eye glass unit 16 and the sandwiching members 21 and 22 when the push pins 31a, 31b, 32a and 32b press down the lenses 18, 18, it may be that the eye glass unit 16 is inclinedly sandwiched, resulting in inappropriate supporting that either one of the glasses floats from the supporting pin 23.

Accordingly, the sandwiching members 21 and 22 are temporarily widened from the above supporting state, and the glasses are temporarily supported by the supporting pins 23, 23 and the press pins 31a, 31b, 32a and 32b only.

By this, even if the eye glass lens 16 is not appropriately supported, its posture is corrected to make the supporting pins 23, 23 and the press pins 31a, 31b, 32a and 32b appropriately contact the respective lenses 18, 18.

Thereafter, the sandwiching members 21 and 22 sandwich the eye glass unit 16 again, and then the columnar members 27 and 28 are turned to retract the press pins 31*a*, 31*b*, 32*a* and 32*b* upwardly.

Figure 9A:
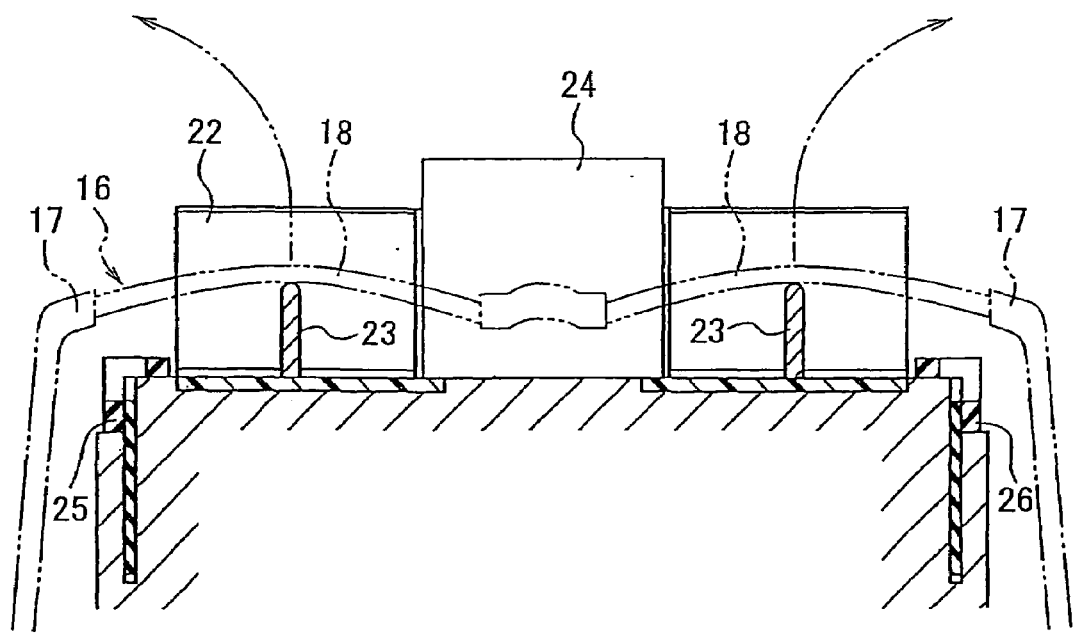
FIGS. 9(a) and 9(b) are sectional views of FIG. 7 along with sectional lines E-E and F-F, respectively, showing a finally sandwiched state.
Figure 9B:
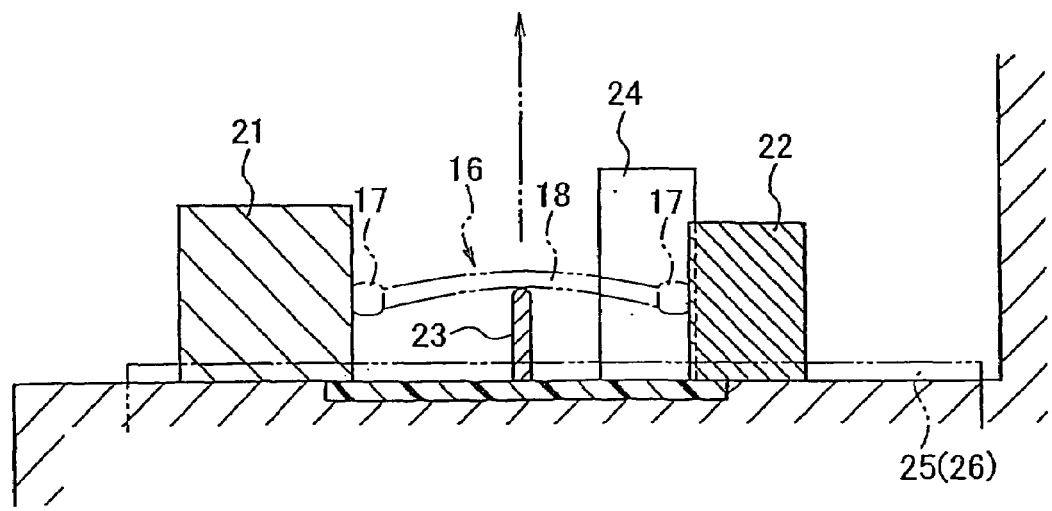

By the above function, as shown in FIG. 9, the eye glass unit 16 is supported at appropriate measurement position and posture by the supporting pins 23, 23 and the sandwiching members 21 and 22.

Next, the controller 9 makes the light sources 7*a* and 8*a* emit their inspection lights, which are inputted to the respective lenses 18, 18 along their optical axes 18*a*, 18*a* by the respective light-projecting systems 7*b* and 8*b*.

Then, the transmitted lights of the inspection lights through the respective lenses 18, 18 are projected on the CCDs 7*d* and 8*d*, respectively (In this embodiment, the common CCD is used as the CCDs 7*d* and 8*d*).

Since the detecting optical systems 7*c* and 8*c* have their Hartmann plate, the transmitted lights are inputted into the CCDs 7*d* and 8*d* as lights carrying information on optical characteristics of small areas of the respective lenses 18, 18 and having two-dimensional spatial resolution, various optical characteristic data of each of the lenses 18, 18 can be obtained when the controller 9 performs arithmetic processing of detected light intensities of arrayed elements of the CCDs 7*d*, 8*d*.

At that time, the positional relationship is set such that the transmitted lights passing the optical axes 18*a*, 18*a* of the lenses 18, 18 are inputted into almost the centers of the CCDs 7*d* and 8*d*, respectively. Since portions of the lenses 18, 18 corresponding to the optical axes 18*a*, 18*a* are supported by the supporting pins 23, 23, strictly speaking, the transmitted lights passing the lenses 18, 18 along the optical axes 18*a*, 18*a* will not actually reach the CCDs 7*d*, 8*d*.

However, since data corresponding to such defect inspection points can be calculated based on detection data at their respective surrounding areas by interpolation, the defect inspection points pose no problem in obtaining the information on the optical characteristics of the entire lenses.

As shown in FIGS. 2 and 3, the thus obtained optical characteristic information is displayed on the monitor 5 according to a given format.

After the measurement of the optical characteristics, the controller 9 controls the driver to return the sandwiching members 21 and 22 to their initial positions, and the feed screw 61 is reversely rotated to raise the frame supports 25, 26 and house the light-shielding members 53 and 54 in the upper casing body 1.

Next, measurement of the optical characteristics of the inspection glass unit 10 shown in FIGS. 13A and 13B will be explained. As shown in FIG. 4, the lens meter 100 is so set in the primary state similarly in the case of the measurement of the eye glass unit product 16 that both the sandwiching members 21, 22 are set largely apart from each other, the frame supports 25, 26 are set urged upwardly, the press pins 31*a*, 31*b*, 32*a* and 32*b* are set retracted upwardly, and the light-shielding members 53 and 54 are housed inside the upper casing 1 as shown in FIG. 11(*a*).

The trial frame adaptor 80 shown in FIG. 14(*a*) is placed over the rear sandwiching member 22 such that its projecting sandwiching portions 81 and 82 project toward the front sandwiching member 21, whereas the trial frame adaptor 70 shown in FIG. 14(*b*) is placed over the front sandwiching member 21 such that its projecting sandwiching portion 71 projects toward the rear sandwiching member 22.

Thereafter, the inspection lens unit 10 is placed on the upper faces 25*a* and 26*a* of the frame supports 25 and 26 between the adaptors 70 and 80.

Then, when a measuring-start order is inputted into the operation button 6, an order input to the operation button 6 is inputted to the controller 9, which operates the driver not shown to move the sandwiching members 21 and 22 interlocking with and approaching to each other.

As shown in FIG. 16, the inspection glass unit 10 placed between the adaptors 70, 80 is sandwiched by the projecting sandwiching portions 71, 81 and 82 of the adaptors 70 and 80, while being butted to the nose pad supporting member 24. Thereby, the inspection glass unit 10 is set to an appropriate measurement position, that is, the optical axes 12*d*, 12*d* of the detachable lenses 12, 12 of the inspection glass unit 10 are set on a straight line connecting the supporting pins 23, 23.

Subsequent operation is similar to the case where the ordinary eye glass unit 16 is measured, and therefore its explanation will be omitted.

As mentioned above, according to the lens meter 100 of this embodiment, when the optical characteristics of the detachable lenses 12, 12 fitted to the inspection glass unit 10 are to be measured, the trial frame adaptors 70 and 80 are fitted to the sandwiching members 21 and 22, respectively, so that the projecting sandwiching portions 71, 81 and 82 of the adaptors 70 and 80 can sandwich and hold the trial frame 11 of the inspection glass unit 10.

In addition, since the adaptors 70 and 80 do not interfere with the movable ranges of the tabs 12*c*, 12*c* of the detachable lenses 12, 12 fitted to the inspection glass unit 10, the detachable lenses will not be turned or displaced when the inspection glass unit 10 is sandwiched with the adaptors 70 and 80. Accordingly, the optical characteristics of the detachable lenses 12, 12 can be measured at high precision, while maintaining the positional relationship between the trial frame 11 attained when the inspection glass unit 10 is first set at the setting portion.

Further, since the adaptors 70 and 80 do not contact the tabs 12*c* and 12*c*, the optical axes 12*d*, 12*d* of the detachable lenses 12, 12 of the inspection glass unit 10 are not set at positions largely deviated from almost the centers of the CCDs 7*d* and 8*d*, respectively. From this point of view, measurement results can be obtained at high precision.

Further, since the adaptors 70 and 80 are fitted to the sandwiching members 21 and 22, respectively, not to the inspection glass unit 10, the adaptors can be fitted more easily as compared with a case where such adaptors are fitted to the inspection glass unit 10.

In the lens meter 100 of this embodiment, the inspection glass frame adaptors 70 and 80 are separately formed from the sandwiching members 21 and 22, and detachably fitted to the sandwiching members 21 and 22, respectively. This is contrived based on the following effects.

That is, if it is frequently required to exchange a case where the optical characteristics of the detachable lenses 12, 12 of the inspection glass units 10 are to be measured and a case where the optical characteristics of lenses of the lenses 18, 18 of ordinary eye glass units 16 are to be measured, it is preferable from the standpoint of easy operation that the adaptors 70 and 80 are preliminarily slidably or turnably attached to the sandwiching members 21 and 22, respectively, and the adaptors 70 and 80 are slid or moved to be fitted to or detached from the actually sandwiching portions of the sandwiching members 21 and 22. Generally, it is considered that the frequency at which the ordinary eye glass units 16 are measured is far greater than that at which the inspection glass units are measured and that the frequency of exchanging in measurement between the ordinary eye glass units 16 and the inspection glass units 10 is very low. In such a case, the adaptors 70 and 80 will not impede the measurement of the ordinary eye glass units 16, when the adaptors 70 and 80 are separately provided from the sandwiching members 21 and 22 rather than the adaptors being preliminarily attached to the sandwiching members.

The inspection glass frame adaptors in the lens meter according to the present invention will not be limited to those 70 and 80 in this embodiment. The adaptors may be formed integrally with the sandwiching members as parts of them, respectively, provided that the adaptors are turned or displaced relative to main bodies of the sandwiching members so that the adaptors may be fitted to or detached from the substantial sandwiching faces of the sandwiching members, respectively.

Figure 17A:
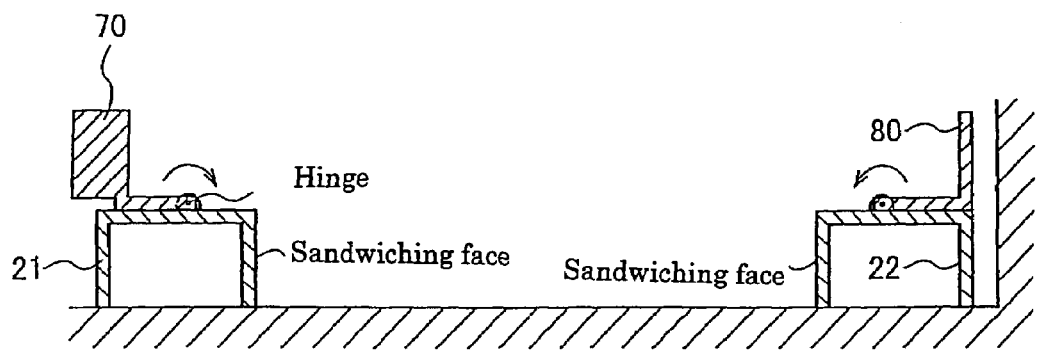
FIGS. 17(a) and 17(b) are sectional views showing inspection glass frame adaptors integrally attached to the sandwiching members, respectively.
Figure 17B:
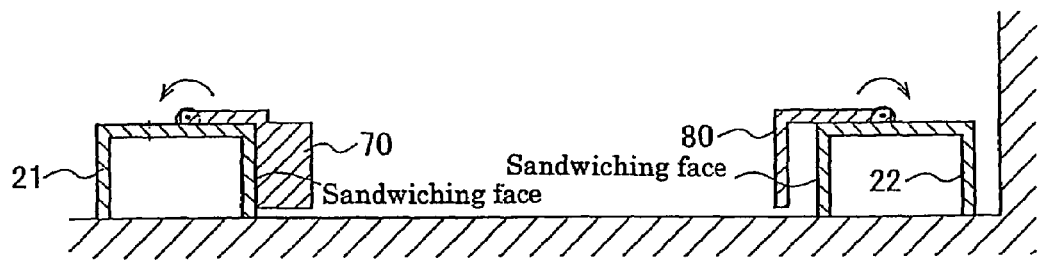

That is, as shown in FIGS. 17(a) and 17(b) as sectional views of sandwiching members 21 and 22 orthogonal to a longitudinal direction thereof, for example, one end of each of the adaptors 70 and 80 each having an almost L-letter section may be turnably axially supported on the upper face of the sandwiching member by a pin-connected hinge (e.g., thin hinge) so that the adaptors 70 and 80 may be integrated with the sandwiching members 21 and 22 and that the adaptors 70 and 80 may be turned around the hinge to be fitted to the sandwiching faces of the sandwiching members 21 and 22 when needed (FIG. 17(b)), whereas the adaptors 70 and 80 may be integrated with the sandwiching members 21 and 22 and that the adaptors 70 and 80 may be turned around the hinge to be detached from the sandwiching faces of the sandwiching members 21 and 22 when not needed (FIG. 17(a)).

In this way, the adaptors 70 and 80 can be fitted to and detached from the sandwiching faces of the main bodies of the adaptors 70 and 80, respectively in the state that the adaptors 70 and 80 are kept integrated with the sandwiching members 21 and 22, respectively. Thus, accidental loss of the adaptors 70 and 80 can be prevented.

Further, when the lens meter has the adaptors 70 and 80 integrated with the sandwiching members 21 and 22 in this way, the fitting and detaching operations of the adaptors 70 and 80 can be carried out by a driver such as electric motor.

Figure 18:
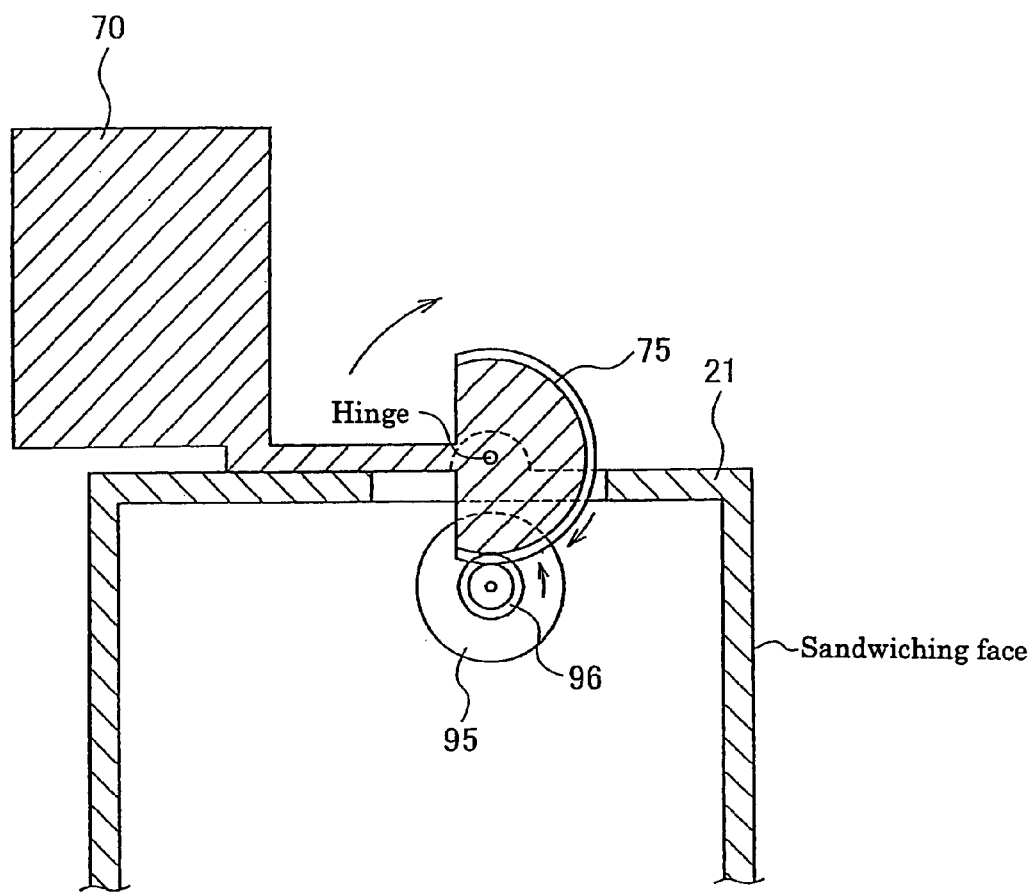
FIG. 18 is a sectional view showing a construction for electrically driving an inspection glass frame adaptor to an attached position and a detached position of a sandwiching member.

That is, as shown in FIG. 18, for example, a gear 75 is attached to the hinge portion for the adaptor 70, and a driven gear 96 which meshes with the gear 75 and an electric motor 95 to turn the driven gear 96 are provided in the sandwiching member 21 with which the adaptor 70 is integrated. The driving of the electric motor 95 is controlled with the controller 9.

According to the thus constructed lens meter 100, if a mode in which the inspection glass unit 10 is to be measured is selected by the operation button 6 provided at the front face of the lens meter 100, the controller 9 controls and drives the electric motor 95, which turns the electric motor 95 in a given rotary direction. Consequently, the electric motor 95 drives the driven gear 96 in a direction shown by an arrow shown, so that the gear 76 of the gear 70 meshing with the driven gear 96 is turned in an arrow direction shown to fit the adaptor 70 to the sandwiching face side of the sandwiching member 21.

On the other hand, when a mode in which the ordinary eye glass unit 16 is to be measured is selected, the electric motor 95 is controlled and turned in a direction reverse to one mentioned above, so that the adaptor 70 is detached from the sandwiching face side of the sandwiching member 21.

FIG. 18 shows only the adaptor 70 and the sandwiching member 21, but a similar construction may be employed for the adaptor 80 and the sandwiching member 22.

Operating load upon the operator can be reduced, when the adaptors 70 and 80 are electrically fitted to and detached from the sandwiching members 21 and 22 in this way, respectively.

In the case of the lens meter in which the adaptors 70 and 80 are manually fitted to and detached from the sandwiching members 21 and 22, it may be automatically detected whether or not the adaptors 70 and 80 are fitted to the sandwiching members 21 and 22, respectively.

Figure 20A:
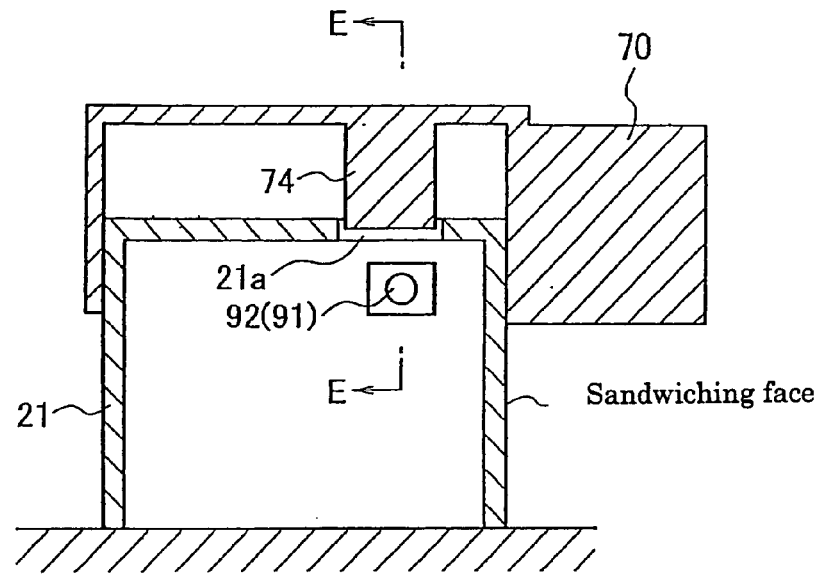
FIGS. 20(a) and 20(b) are figures illustrating another detecting construction to detect whether the inspection glass frame adaptors are fitted or not.
Figure 20B:
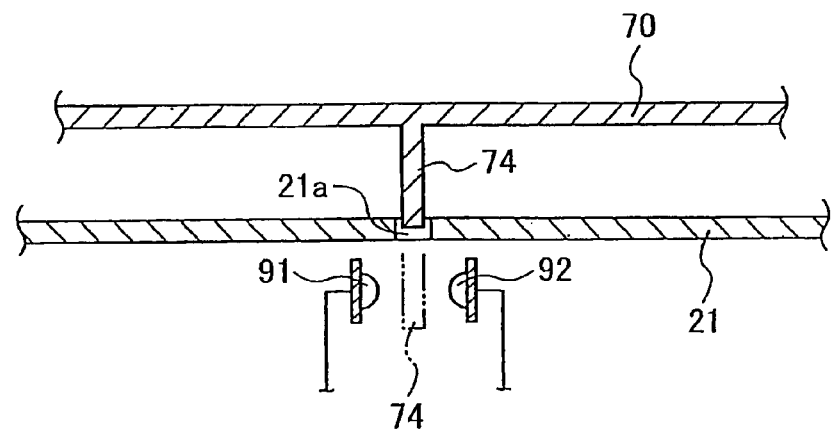
Figure 21:
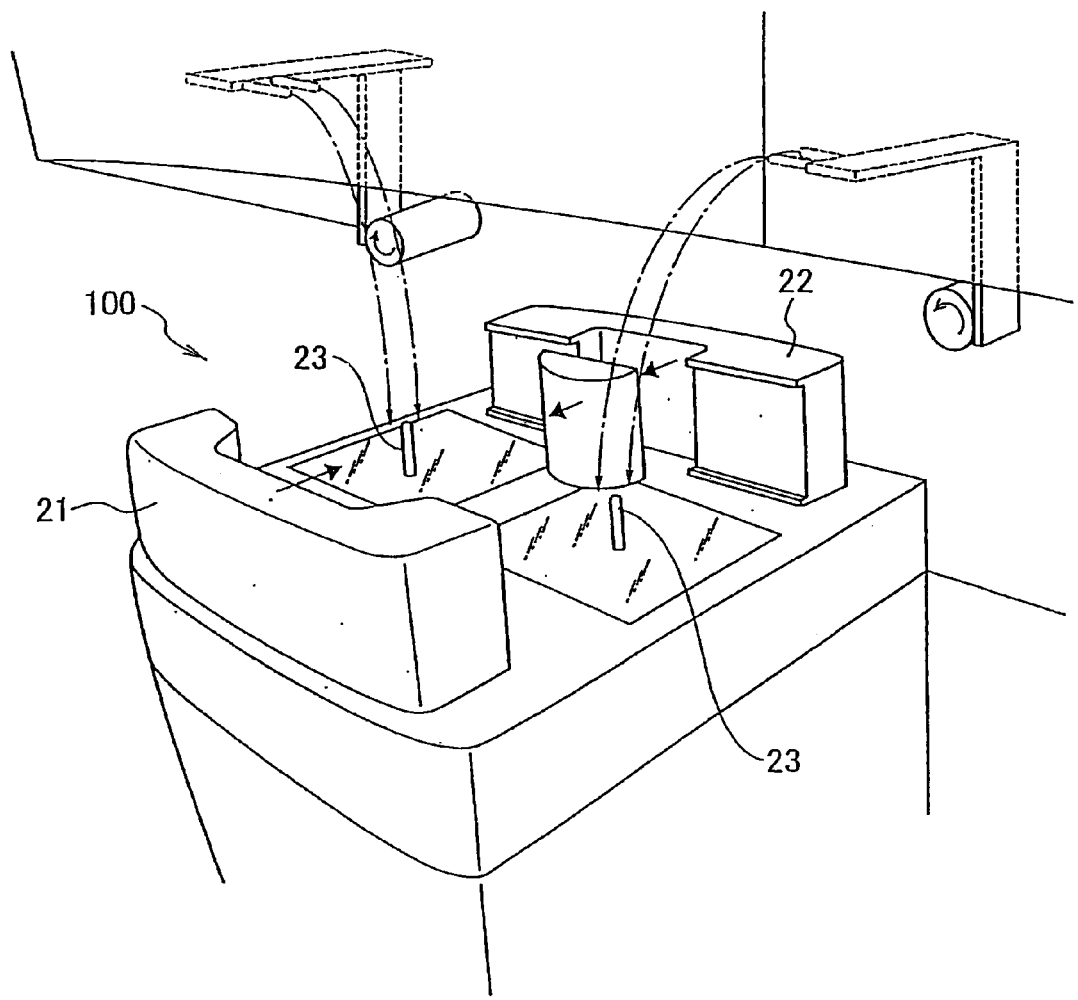
FIG. 21 is a perspective view showing an eye glass unit sandwiching members in the conventional lens meter.
Figure 22:
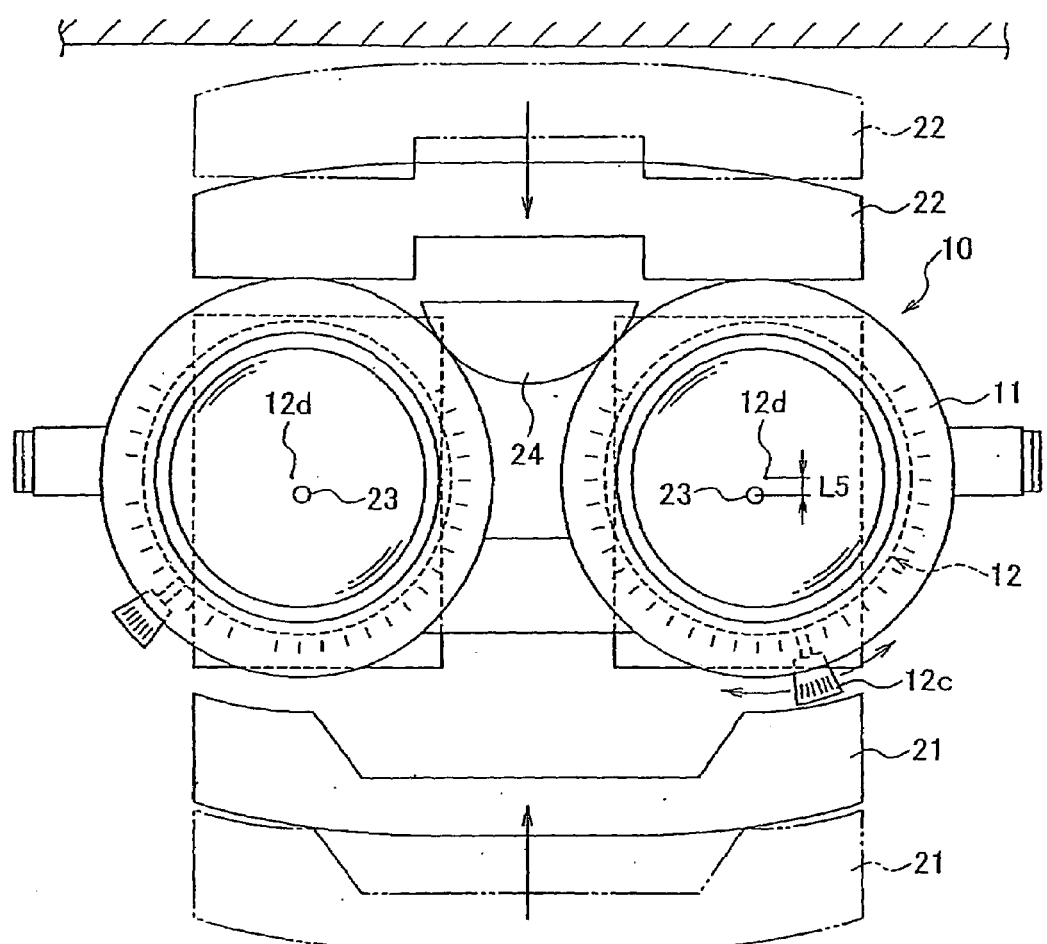
FIG. 22 is a plane view illustrating a state in which the inspection lens unit is set to the lens meter shown in FIG. 21.

As shown in FIGS. 19(a) and 19(b), whether the adaptors 70 and 80 are not fitted to the sandwiching members 21 and 22 (FIG. 19(a)) or the adaptors 70 and 80 are fitted to the sandwiching members 21 and 22 (FIG. 19(b)) may be detected by discriminating with the controller 9 with reference to contour shapes of the sandwiching members 21 and 22 or the adaptors 70 and 80 projected on the CCDs 7d and 8d before sandwiching with the sandwiching members 21 and 22 (initial stage). Alternatively, as shown in FIGS. 20(a) and 20(b), an adaptor 70 is provided with a pawl 74 projecting toward a sandwiching member 21 which has a slit 21a at an upper face to allow passage of the pawl 74, a photo coupler 91, 92 is provided inside the sandwiching member 21 for detecting if the pawl 74 is inserted through the slit 21a, and whether the adaptors 70 and 80 are not fitted to the sandwiching members 21 and 22 (shown by a solid line in FIG. 20(a)) or the adaptors 70 and 80 are fitted to the sandwiching members 21 and 22 (shown by a chain double-dashed line in FIG. 20(b)) may be detected by discriminating with the controller 9 based on detection signals from the photo coupler 91, 92.

FIG. 20 shows only the adaptor 70 and the sandwiching member 21, but a similar construction may be employed for the adaptor 80 and the sandwiching member 22. Further, such an automatic detecting mechanism may be employed irrespective of whether the adaptors 70 and 80 are separate from or integral with the sandwiching members 21 and 22, respectively.

Further, mistake regarding attachment and detachment of the adaptors 70 and 80 can be suppressed by informing the operator of the detection result through displaying in the monitor, etc. according to the controller 9, as to whether or not the adaptors 70 and 80 are fitted.

Further, in the case of the lens meter 100 in which the operation button is pushed to enable the controller 9 to discriminate the measurement mode (inspection lens unit-measuring mode) in which the adaptors 70 and 80 need to be fitted and the measurement mode (eye glass unit product-measuring mode) in which the adaptors need not be fitted, it may be that the controller 9 compares a discrimination result between the fitting case and the non-fitting case corresponding to the measurement modes with a detection result as to whether or not the adaptors 70 and 80 are fitted, and if the comparison result is correct, the measurement start is controlled, i.e., the controller drives and controls various drivers, whereas if the comparison result is not correct, the controller makes the monitor 5 display a message requesting the adaptors 70 and 80 to be fitted or detached corresponding to the measurement mode without starting the measurement.

In this way, the controller 9 automatically detects the fitting and non-fitting of the adaptors 70 and 80, and thus mistake regarding the fitting and detaching of the adaptors 70 and 80 relative to the sandwiching members can be prevented by calling attention to the operator or by not commencing the measurement starting operation.

What is claimed is:

1. A lens meter comprising:
a glass unit support for supporting an eye glass unit such that lenses of the eye glass unit are almost horizontal,
light sources for emitting given inspection lights, respectively,
light-projecting optical systems for projecting inspection lights emitted from the light sources upon the lenses of the eye glass unit supported by the glass unit support substantially along optical axes of the lenses, respectively,
light detectors, and
light-detecting optical systems for leading transmitted lights of the inspection lights passing the lenses of the eye glass unit to the light detectors, respectively,
said glass unit support comprising two sandwiching members which are displaceable nearer or apart from each other and adapted to sandwich an outer peripheral portion of the eye glass unit in cooperation with each other, and inspection glass frame adaptors being capable of being fitted to and detached from said two sandwiching members, respectively,
said inspection glass frame adaptors comprising projecting sandwiching portions, respectively, which project toward opposite sandwiching members, respectively, when the adaptors are fitted to the sandwiching members, respectively, and which contact portions of a frame of an inspection glass unit other than movable areas of tabs of detachable lenses projecting from the frame of the inspection glass lens unit supported by the glass unit support as the eye glass unit, whereas portions of the adaptors other than the projecting sandwiching portions do not interfere with the movable areas of the tabs, respectively.

2. The lens meter set forth in claim 1, wherein the inspection glass frame adaptors are separately and detachably formed from the sandwiching members, respectively.

3. The lens meter set forth in claim 1, further comprising a connecting member connecting the two sandwiching members, such that the sandwiching members are adapted to be displaced in opposite directions and by an almost identical displacement distance, said saudwiching members interlocking with each others, and wherein
a positional relationship between the sandwiching members and the respective light detectors is so set that the transmitted lights passing optical axes of the lenses of the eye glass unit sandwiched by the sandwiching members enter centers of detecting zones of the light detectors, respectively, and wherein
projecting amounts of the respective projecting sandwiching portions are so set that when the inspection glass frame adaptors are fitted to the sandwiching members, respectively, and the frame of the inspection glass unit is sandwiched with the inspection glass frame adaptors, the transmitted lights passing the optical axes of the lenses of the detachable lenses of the inspection glass unit enter almost centers of light-detecting zones of the light detectors, respectively.

4. The lens meter set forth in claim 1, wherein the adaptors are placed over the two sandwiching members, respectively, and are uniquely located through engaging with parts of contour shapes of the sandwiching members, respectively, as viewed in plane.

5. The lens meter set forth in claim 1, wherein one of the adaptors is adapted to contact an almost central portion of a lateral connecting portion of the frame of the inspection glass unit, and projecting sandwiching portions of a second adaptor are adapted to contact right and left lower edges of the inspection glass frame which are outside movable ranges of the tabs, respectively.

6. The lens meter set forth in claim 1, wherein the adaptors are preliminarily slidably or turnably fitted to the sandwiching members, respectively, so that the adaptors are adapted to be slid or turned relative to the respective sandwiching members, and so that the adaptors are adapted to be fitted or detached from actually sandwiching portions of the sandwiching members, respectively.

7. The lens meter set forth in claim 1, wherein the adaptors are formed integrally with the sandwiching members as their parts, respectively, and the adaptors are turned relative to main bodies of the sandwiching members so that the adaptors are adapted to be fitted to or detached from actually sandwiching face sides of the sandwiching members, respectively.

8. The lens meter set forth in claim 7, further comprising a driver adapted to fit and detach the adaptors relative to the sandwiching members, respectively.

9. The lens meter set forth in claim 1, wherein said adaptors are manually fitted to or detached from the sandwiching members, respectively, and whether or not the adaptors are fitted to the sandwiching members, respectively, is automatically detected.

10. The lens meter set forth in claim 1, further comprising
a controller,
an operation button, and
a monitor, and wherein, when the operation button is pushed, the controller is adapted to discriminate
a first measurement mode, comprising an inspection lens-measuring mode, in which the adaptors need be fitted to the sandwiching members, respectively, and
a second measurement mode, comprising a product eye glass unit lens-measuring mode, in which the adaptors need not be fitted to the sandwiching member, and wherein
the controller compares a discrimination between a fitted case and a non-fitting case corresponding to the measurement modes with a detection result as to whether or not the adaptors are fitted, and
if a comparison result is matching, measurement start is controlled, wherein various drivers are driven and controlled,
whereas, if the comparison result is not matching, a message requesting the adaptors to be fitted or detached from the sandwiching members, respectively, corresponding to the measurement mode is displayed in the monitor without starting the measurement.

11. The lens meter set forth in claim 1, further comprising
a pair of supporting pins adapted to support right and left lenses from lower sides thereof,
frame supports provided on opposite outer sides of the sandwiching members and adapted to support right and left frame portions, and
pressing pins adapted to press upper faces of the right and left lenses, and wherein
(a) the frame supports are movable up and down between a first position in which positions of upper faces of the frame supports are higher than tops of the supporting pins, and a second position in which the positions of the upper faces of the frame supports are not higher than the tops of the supporting pins,
(b) the eye glass unit or the inspection glass unit is set on the frame supports having their upper faces located higher than the tops of the supporting pins, (c) the eye glass unit or the inspection glass unit is slidably supported by both the sandwiching members or the inspection glass frame adaptors, respectively, (d) upper faces of right and left lenses of the eye glass unit or the inspection glass unit are pressed down by the pressing pins, respectively, (e) the right and left lenses are sandwiched each between the corresponding pressing pin and the supporting pin, (f) the frame supports are lowered to positions lower than tips of the supporting pins, (g) if necessary, after the sandwiching members or the adaptors are released from the frame, the frame is sandwiched by the sandwiching members or the adaptors again, (h) the pressing pins are retracted upwardly, and (i) the right and left lenses of the eye glass unit or the inspection glass unit are supported at appropriate measuring positions and postures by the supporting pins and the sandwiching members or the adaptors.

12. The lens meter set forth in claim 1, further comprising a nose pad-supporting member located between the sandwiching members and in an almost central position in a lateral directions and having a circular arc peripheral face opposed to the front sandwiching members, and wherein the nose pad-supporting member is slidable from a central position in front and rear directions toward a rear side, and the circular arc peripheral face of the nose pad-supporting member contacts the nose pads of the eye glass unit or the inspection glass unit when the sandwiching members or the adaptors sandwich the eye glass unit or the inspection glass unit and then applies pressing force upon nose pads according to an urging force of the nose pad-supporting member.

13. The lens meter set forth in claim 2, further comprising a connecting member connecting the two sandwiching members, such that the sandwiching members are adapted to be displaced in opposite directions and by an almost identical displacement distance, said saudwiching members interlocking with each other, and wherein a positional relationship between the sandwiching members and the respective light detectors is so set that the transmitted lights passing optical axes of the lenses of the eye glass unit sandwiched by the sandwiching members enter centers of detecting zones of the light detectors, respectively, and wherein projecting amounts of the respective projecting sandwiching portions are so set that when the inspection glass frame adaptors are fitted to the sandwiching members, respectively, and the frame of the inspection glass unit is sandwiched with the inspection glass frame adaptors, the transmitted lights passing the optical axes of the lenses of the detachable lenses of the inspection glass unit enter almost centers of light-detecting zones of the light detectors, respectively.

\* \* \* \* \*